US010493804B2

(12) United States Patent
Fink

(10) Patent No.: US 10,493,804 B2
(45) Date of Patent: Dec. 3, 2019

(54) METHODS FOR USE BY ICE ADAPTIVE TIRE SYSTEMS

(71) Applicant: Ice Adaptive Tires LLC, Santa Ana, CA (US)

(72) Inventor: Norman S. Fink, Lake Forest, CA (US)

(73) Assignee: Ice Adaptive Tires, LLC, Santa Ana, CA (US)

( * ) Notice: Subject to any disclaimer, the term of this patent is extended or adjusted under 35 U.S.C. 154(b) by 478 days.

(21) Appl. No.: 15/187,664

(22) Filed: Jun. 20, 2016

(65) Prior Publication Data

US 2016/0288583 A1   Oct. 6, 2016

Related U.S. Application Data

(63) Continuation of application No. 14/447,363, filed on Jul. 30, 2014, now Pat. No. 9,409,455, which is a
(Continued)

(51) Int. Cl.
*B60C 11/16* (2006.01)
*B60C 27/06* (2006.01)
(Continued)

(52) U.S. Cl.
CPC ...... *B60C 11/1612* (2013.01); *B60C 11/1625* (2013.01); *B60C 11/1637* (2013.01);
(Continued)

(58) Field of Classification Search
CPC ............. B60C 11/1612; B60C 11/1693; B60C 11/1625; B60C 11/1637; B60C 27/045;
(Continued)

(56) References Cited

U.S. PATENT DOCUMENTS 3,095,918 A * 7/1963 Mike .................. B60C 11/1612
152/208
3,330,563 A    7/1967 De Puydt
(Continued)

FOREIGN PATENT DOCUMENTS

JP    S61169304    7/1986
LU    84612    10/1984
WO    WO 2012/084412    6/2012

OTHER PUBLICATIONS

Search Report dated Sep. 19, 2019, from Related European Case Application No. 19168149.3.

*Primary Examiner* — S. Joseph Morano
*Assistant Examiner* — Jean W Charleston
(74) *Attorney, Agent, or Firm* — Farjami & Farjami LLP

(57) ABSTRACT

In one aspect, a method provides a reciprocating bolt by a bolt assembly having a bolt assembly body, a cap affixed to the bolt assembly body, and a base affixed to the bolt assembly body opposite the cap. The method includes biasing a bolt carrier in the bolt assembly body in a retracted position relative to the bolt assembly, resulting in a center portion of a diaphragm disposed between the cap and the bolt assembly body being deflected toward the cap. The method also includes applying an actuation force to the bolt carrier so as to move the bolt carrier from the retracted position to an extended position relative to the bolt assembly by oppositely deflecting the center portion of the diaphragm toward the base, and discontinuing the applying of the actuation force while the bolt carrier is in the extended position.

26 Claims, 26 Drawing Sheets

Related U.S. Application Data continuation of application No. 14/098,159, filed on Dec. 5, 2013, now Pat. No. 9,045,013, which is a continuation-in-part of application No. PCT/US2013/055870, filed on Aug. 20, 2013.

(60) Provisional application No. 61/691,076, filed on Aug. 20, 2012, provisional application No. 61/691,222, filed on Aug. 20, 2012.

(51) Int. Cl.
*B60C 27/04* (2006.01)
*B60S 5/00* (2006.01)
*F16L 27/08* (2006.01)
*B60C 9/20* (2006.01)
*B60C 23/00* (2006.01)

(52) U.S. Cl.
CPC ........ *B60C 11/1693* (2013.01); *B60C 27/045* (2013.01); *B60C 27/068* (2013.01); *B60S 5/00* (2013.01); *F16L 27/0804* (2013.01); *B60C 9/2006* (2013.01); *B60C 23/003* (2013.01); *Y10T 29/49718* (2015.01); *Y10T 137/0402* (2015.04)

(58) Field of Classification Search
CPC ... B60C 27/068; B60C 23/003; B60C 9/2006; B60S 5/00; Y10T 137/0402; Y10T 29/49718; F16L 27/0804
USPC .......................................................... 301/46
See application file for complete search history.

(56) References Cited

U.S. PATENT DOCUMENTS

| | | | | |
|---|---|---|---|---|
| 3,872,908 A | * | 3/1975 | Einarsson | B60C 11/1612 152/208 |
| 4,019,552 A | | 4/1977 | Tsuruta | |
| 4,294,490 A | * | 10/1981 | Woelfel | B29C 53/60 301/64.703 |
| 4,619,301 A | * | 10/1986 | Hiroki | B60C 11/1618 152/160 |
| 6,688,355 B2 | * | 2/2004 | Rayman | B60C 11/02 152/167 |
| 2006/0213595 A1 | * | 9/2006 | Volt | B60C 11/1606 152/210 |
| 2011/0260522 A1 | * | 10/2011 | Bormann | G01M 1/365 301/5.21 |

* cited by examiner

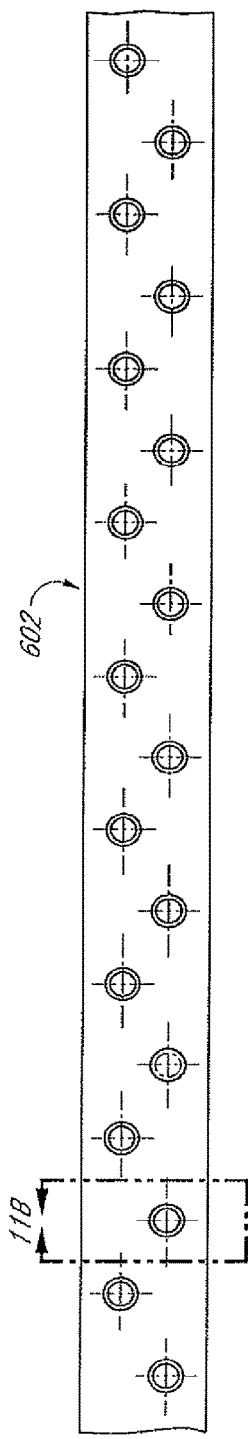
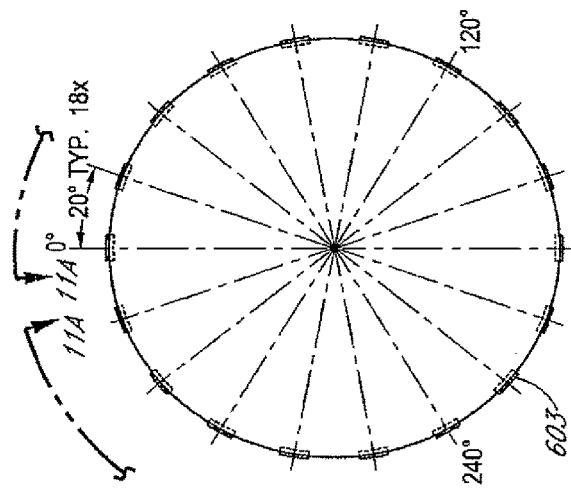
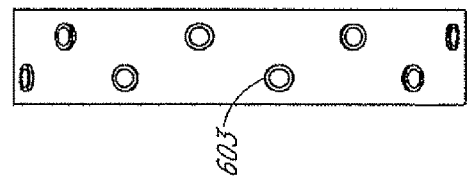
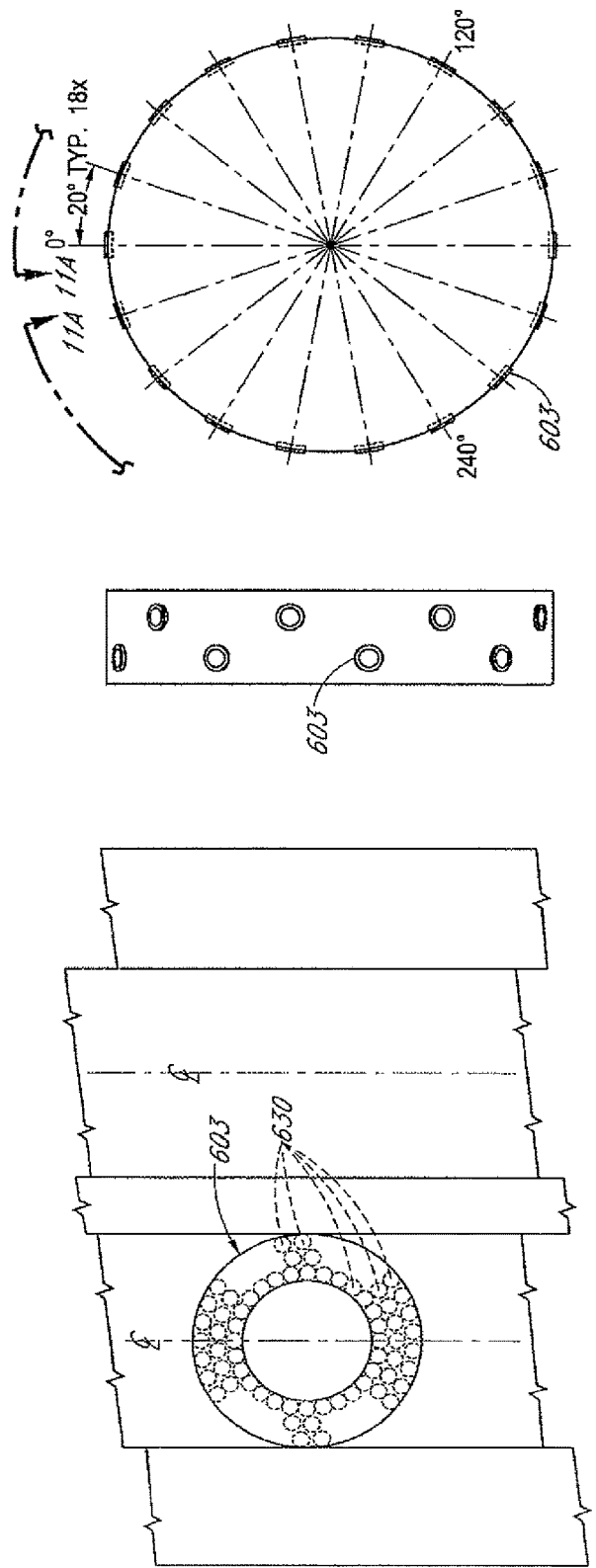
FIG. 11A
FIG. 11B
FIG. 11C
FIG. 11D

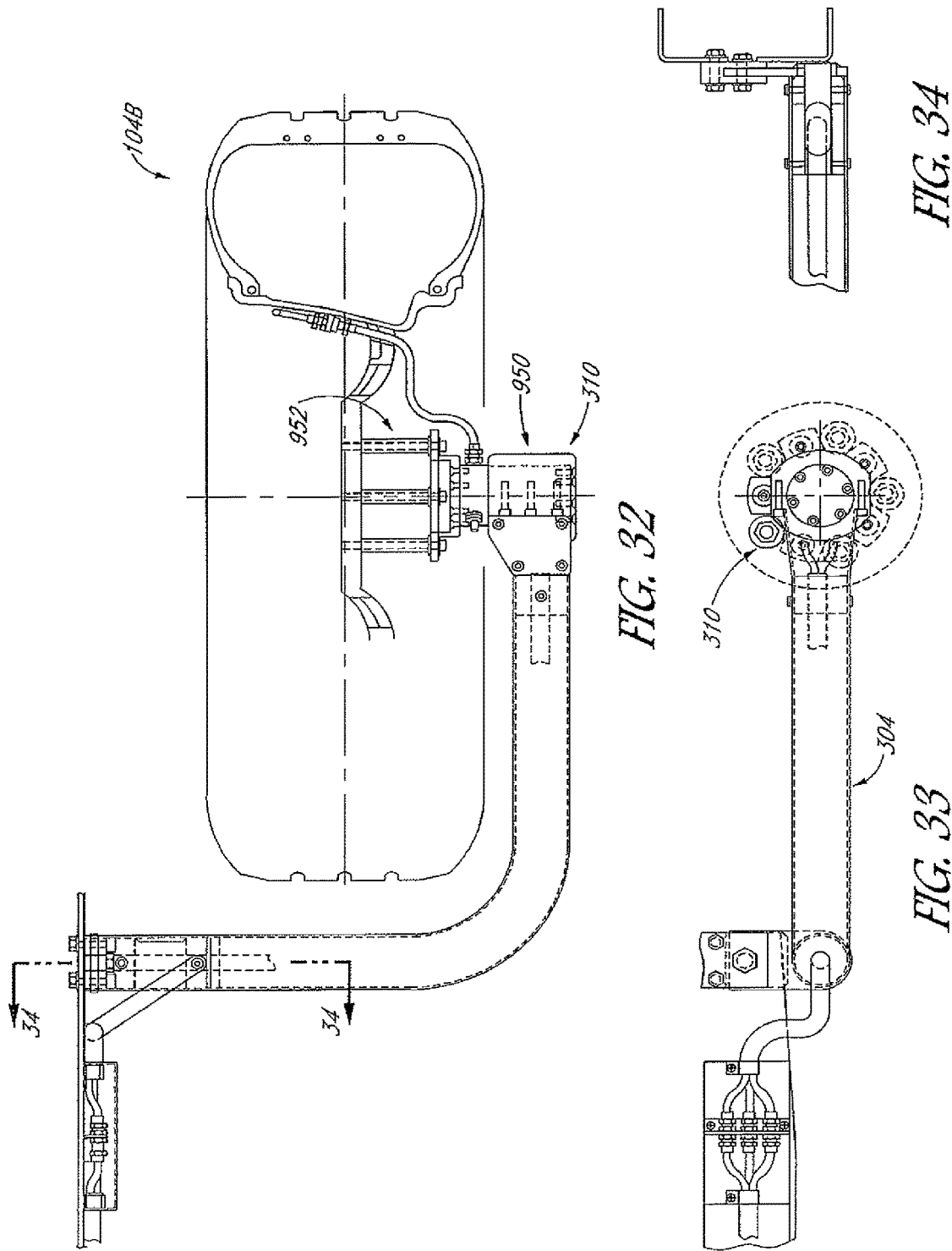

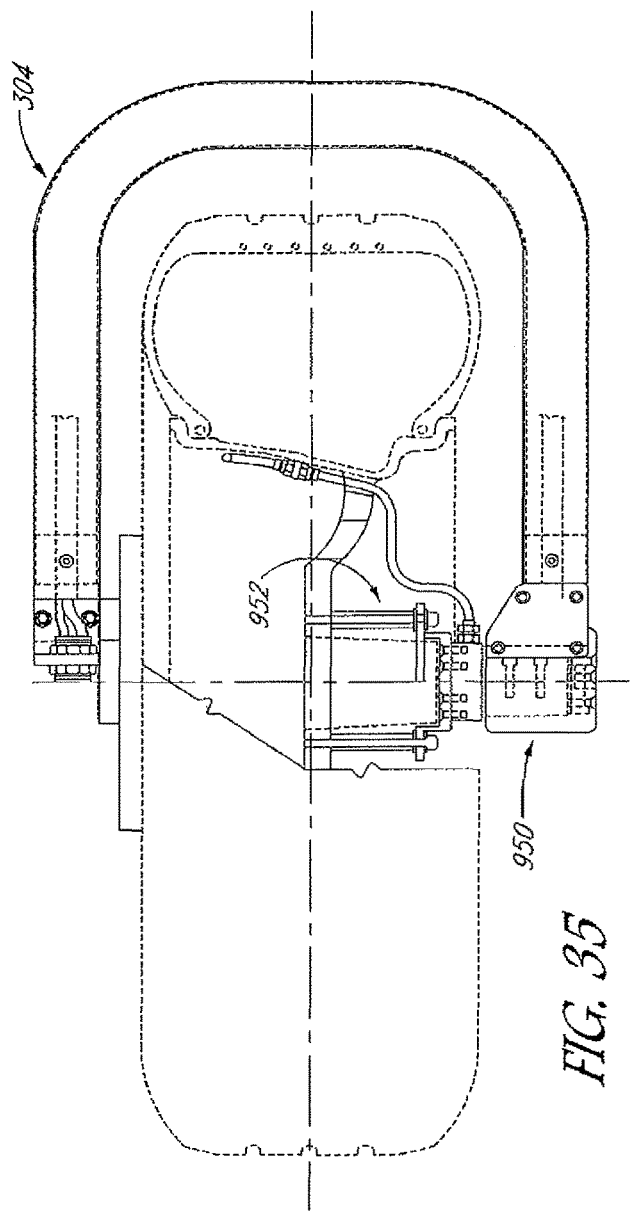
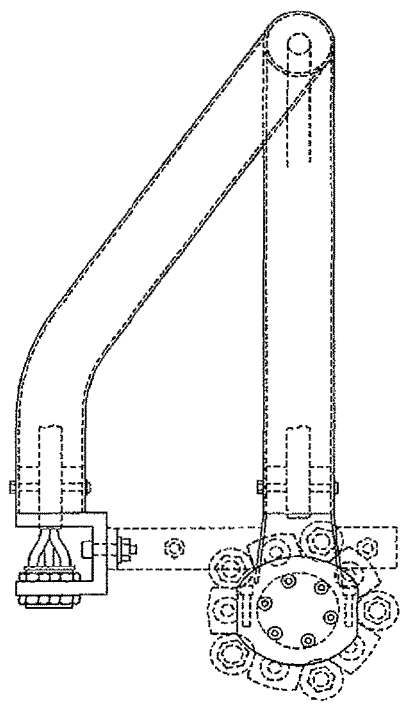
FIG. 35
FIG. 36

METHODS FOR USE BY ICE ADAPTIVE TIRE SYSTEMS

RELATED APPLICATIONS

The present application is a continuation of U.S. patent application Ser. No. 14/447,363, filed Jul. 30, 2014, which is a continuation of U.S. patent application Ser. No. 14/098,159, filed Dec. 5, 2013, which is a continuation-in-part of PCT Application No. PCT/US2013/055870, filed on Aug. 20, 2013, which claims priority to U.S. Provisional Patent Application No. 61/691,076 filed Aug. 20, 2012 and U.S. Provisional Patent Application No. 61/691,222 filed Aug. 20, 2012, the entire contents of both of which are hereby expressly incorporated by reference.

FIELD OF THE INVENTIONS

The inventions disclosed herein relate to adaptive tire systems such as, for example, tire systems designed to adapt to changing road conditions such as road conditions changing from dry road to ice covered roads.

BACKGROUND OF THE INVENTIONS

Vehicle tires support wheel axle load on a tread area in contact with a road surface. The tire contact area multiplied by inflation pressure will be equal to the wheel axle load.

Coefficient of friction between tread and road surface multiplied by the axle load is the maximum force, parallel to the road surface, that can be applied to the tire contact area by the wheels to stop, accelerate, corner or maintain speed on a grade without tire slippage at the contact between the road and tire. As an example, if a tire tread coefficient of friction is 0.30, and an axle load is 1,000 pounds, the maximum friction force between the tire and road surface before tire slippage will be 300 pounds. If a braking load or an acceleration load, greater than 300 pounds at the tread/road interface is developed, wheel rotation will decrease or increase respectively and when the slippage occurs to some degree, a loss of control may occur.

Almost all automobiles have brakes and engine capacities sufficient to generate loads that exceed tire friction traction on dry concrete, asphalt, gravel, or dirt. This capacity introduces a responsibility for vehicle operators to use restraint from applying full throttle when accelerating and using maximum braking and steering to maintain safe operation and reasonable service life of tires and vehicle components.

The coefficient of friction between tires and wet pavement is moderately reduced from dry conditions and requires drivers to use longer stopping distances and lower maximum acceleration values. Driving on wet level, sloped, or curved roads with conventional tires has been found to be manageable by drivers notwithstanding that wet brakes and potential for hydroplaning introduce a need for caution.

The coefficient of friction between tire tread and ice is so low, however, control of a vehicle on ice covered roads under most conditions at moderate speed is precluded unless surface friction has been increased by sand or chemicals, or unless the vehicle's tires have been fitted with chains, or studs to develop reactive forces.

Loss of control on ice is typically evidenced by spinning wheels when initiating motion, locking of wheels when braking, and lack of steering response (e.g. "understeering") due to insufficient friction between the vehicle's tires and road surface for vehicle traction.

Tire chains and tire studs function by impressing a fixed-shape chain or stud component into ice by tire tread to develop tractive force which is limited by shear values of ice and geometry of components.

Some known designs for tires with retractable studs rely on perpetual maintenance of air pressure in order to maintain the associated stud in a deployed position. Additionally, some systems use, and thus can deplete, air within a tire in order to cause movement of a stud, for example, between a retracted and a deployed position.

SUMMARY OF THE INVENTION

An aspect of at least one of the inventions disclosed herein includes the realization that using a locking mechanism which provides a locking engagement of a retractable ice engagement member can avoid problems associated with prior known systems noted above. For example, in some known designs, as noted above, a deployable tire stud is maintained in a deployed position only with a perpetual maintenance of internal pressure. However, as the associated tire rolls across the ground, the studs are pressed against their actuators and the maintained air pressure as well as the associated seals which can cause leakage. Thus, use of such a tire with studs in a deployed position can deplete the system of air thereby failing to maintain the associated studs in a desired deployed position and or requiring periodic replenishment of lost air. Further, some systems rely on the air held within a tire for maintaining such deployed positions of studs as well as for retraction of studs. Thus, repeated extension and retraction of studs can cause an associated tire to lose a sufficient amount of air that the tire pressure will fall below a desired level.

Thus, in accordance with at least some of the embodiments disclosed herein, an adaptive tire can include a retractable bolt for enhancing traction and a lock mechanism for locking the bolt at least in a deployed position without the need for relying on persistently maintained air pressure to keep the bolt in the deployed position. As such, such a tire can avoid the problems associated with the need for persistently maintained air pressure and the associated leakage that can occur. Further, such a system can avoid the depletion of air pressure within a tire that can result from systems which utilize air pressure within the tire for actuation purposes. Additionally, a bolt locked in an extended position can perform similarly to a conventional fixed stud, exerting greater force at tire-ice interface than that generated by systems using air pressure to maintain a bolt in an extended position.

Another aspect of at least one of the inventions disclosed herein includes the realization that an adaptive tire which includes an air actuation system, can avoid the problems of potentially depleting air pressure within a tire with an air actuation system that is independent of the volume of air within a tire. For example, an adaptive tire can include an air actuation system which utilizes compressed air for moving a bolt from a retracted to a deployed position and such an air system can be configured such that the air actuation system is independent of the air utilized for maintaining the tire in an inflated state for supporting wheel axle load. For example, the air actuation system can have air inputs and optionally outputs that are independent from ports used for inflating the tire.

Another aspect of at least one of the inventions disclosed herein includes the realization that retractable tire bolts can provide better performance where they are adjustable such that their deployed position can be changed. For example, as the tread of a tire wears down and as the tip of the bolt wears down, the effective protruding distance of a bolt changes. More specifically, as tread is worn down, a bolt will protrude farther from the tire tread. On the other hand, as the tip of a bolt wears down, the bolt will protrude less.

Thus, in accordance with some of the embodiments disclosed herein, an adaptive tire can include retractable and deployable bolts that have an adjustable length. As such, the length of the bolts and thus the magnitude of the protrusion of the bolt can be adjusted for tread wear, the weight of the vehicle, road conditions including ice type, and other factors, as well as that in addition to such adjustments the bolts or ends may be removed and replaced from tire exterior while tire is inflated, deflated, on wheel or off wheel.

Another aspect of at least one of the inventions disclosed includes the realization that a tire reinforcement wire belt for use with openings for an air actuation system can be constructed by welding a thin disk to either side of belt wires, constructing an opening in the disk for actuators and bolts, calendering the belt with rubber, and installing within a tire carcass.

Additionally one of the inventions disclosed includes the realization that an alternate tire reinforcement can be constructed using typically constructed calendered wire reinforcement belts with openings created thereafter for actuators and bolts where such belts are then reinforced with multiple KEVLAR® transition belt sections at such openings, and such KEVLAR® belt sections at these openings have strand orientations radially, axially, bias to right, and bias to left that are bonded into the tire structure.

Additionally one of the inventions disclosed includes the realization that the interface between a tire and an actuator configured to function to lock, unlock, extend and retract a bolt for ice engagement by the tire can be an interface on the tire side having no threaded components sealed into the tire and no threaded fittings for delivery of actuating air from passageways in tire to actuators.

Another aspect of at least one of the inventions disclosed herein includes the realization that maintenance, servicing, and repair of adaptive tires which include retractable and deployable bolts can be simplified and reduced in cost by providing such an adaptive tire with replaceable tips for the bolts. For example, when such a tire is used, eventually, the tips of the bolts, regardless of the material, wears down. However, only a small portion of the tip of the bolt is worn down because such systems typically only deploy studs or bolts with a small fraction of an inch of protrusion beyond the surrounding tire tread. Thus, by providing an adaptive tire having bolts or studs with a replaceable tip, the functionality of an adaptive tire can be maintained more easily and at less cost.

Another aspect of at least one of the inventions disclosed herein includes the realization that an arrangement of valves can be used to control deployment, retraction, and locking of a retractable bolt of an adaptive tire. Further benefits can be achieved by configuring the valves to operate deployment, retraction, and locking with air from a single source.

Thus, in accordance with at least one of the embodiments disclosed herein, an adaptive tire system includes a plurality of valves mounted on a wheel associated with the tire, wherein the valves of a plurality of tires of an associated vehicle are configured to utilize a single source of compressed air for unlocking, retraction, or deployment of studs which protrude outwardly from an outer surface of the tread of an associated tire.

Another aspect of at least one of the inventions disclosed herein includes the realization that additional components can be used to automatically control actuation of deployable and retractable tire bolts from a location remote from the wheel, such as from inside the associated vehicle.

Thus, in accordance with at least one of the embodiments disclosed herein, an adaptive tire system includes a rotary air distribution device configured to guide at least two channels of actuation air from a vehicle body into a spinning wheel of the vehicle. Thus, for example, one such channel could be used for unlocking a tire bolt actuator and the second channel can be used for deploying the bolt.

In some embodiments, the system includes a remotely operated air supply control device for supplying unlocking and actuating air. For example, such a system can include a user input device, such as a single button or switch disposed in a cockpit of an associate vehicle, the actuation of which is detected by the system and where the system delivers air for unlocking and air for deploying a bolt.

Another aspect of at least one of the inventions disclosed herein includes the realization that the cost and weight of a system can be beneficially reduced by providing an adaptive tire with a layout of bolts in a configuration such that at least one stud is functionally engaged with a road surface at any one time. In this context, the spacing of the bolts would result in the movement of a tire such that as one bolt becomes functionally disengaged from a road surface, another bolt engages or has been engaged with the road surface. As such, the tire can maintain a functional engagement between a bolt and, for example, an ice covered road surface, while minimizing the number of bolts and actuators and thus the mass and cost of the adaptive tire.

Another aspect of at least one of the inventions disclosed herein includes the realization that where it is desired to deliver at least two independent channels of actuation energy from a vehicle body to a tire, a multichannel rotary union can be used to deliver actuation energy, for example, pressurized fluid such as air. Thus, in accordance with at least one of the embodiments disclosed herein, an adaptive tire system including retractable and extendable bolts, can include a multichannel rotary union configured to guide at least two independent channels of actuation energy from the vehicle body to the adaptive tire. As such, actuators disposed in the adaptive tire can be controlled from the vehicle for example from within the vehicle without the need to exit the vehicle and or touch the wheel assembly associated with the tire. Further, by providing the actuation energy through a rotary union, there is no need to further connect a source of actuation energy or to provide a local energy source for the actuators within the tire. Additionally, by providing at least two independent channels of actuation energy, a plurality of different functions can be performed independently of one another.

Another aspect of at least one of the inventions disclosed herein includes the realization that systems which intermittently use rotary unions for transmitting media and/or energy from the vehicle body to an adaptive tire can be provided with an enhanced useful life by including retractable seals. For example, known rotary unions typically include fixed seals between a stater body and a rotating shaft for transmitting media such as fluids from the stator body into the rotating shaft. The seals which are designed to provide fluid tight seals between the stator body and the rotating shaft, are worn down during rotation of the shaft relative to the stator body. However, there are some systems that do not require an included rotary union to be functional at all times. For example, some known uses for single channel rotary unions include systems for inflating tires of a vehicle by transmitting pressurized air, through a rotary union, into a vehicle wheel and tire for providing inflation air. Such systems could incorporate appropriate valves such that pressurized air does not need to be provided through the Rotary union at all times. Rather, pressurized air can be used only during and operation of inflating or the inflating tires. Thus, the seals within the Rotary union are only used during the operation of inflation or re-inflation.

At least some of the embodiments of the adaptive tire systems disclosed herein do not require a continuous supply of actuation energy, such as a working fluid, to be delivered to the tire from the vehicle. Rather, some of the systems disclosed herein only require actuation energy during specific operations, such as unlocking, extending, and optionally retracting bolts used for enhancing traction on compromised road services, such as ice covered road services.

Thus, in either of the two environments of use noted above, as well as other environments of use, wear of the seals of a rotary union can be reduced or slowed by using retractable seals that can be extended during times of operation. At other times, the portion of seals in contact with the rotating shaft can be retracted to prevent wear of the seals, while the rotary union is not being used for transmitting media, fluid, or energy.

Thus, in accordance with at least some of the embodiments disclosed herein, a rotary union can include retractable seals. For example, the seals between a stator body and a rotating shaft can be inflatable and deflatable. As such, for example, the seals can be inflated during periods of operation, thereby causing the seals to press against surrounding surfaces thereby creating seals, such as fluid tight seals. During periods when there is no fluid flow or pressure, on the other hand, the seals can be deflated, thereby allowing the outer surfaces to retract from the rotating shaft, thereby preventing the outer surfaces of the seals from pressing against surfaces that slide against them during periods of operation. Other configurations can also be used.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 11A is a layout view of an optional configuration of the steel belt layer included in the tire of FIG. 9, identified as view 11A-11A in FIG. 11D.

FIG. 11B is an enlargement of the partial plan view identified as 11B in FIG. 11A.

FIG. 11C is a side view of the steel belt layer of FIG. 11A, in the circular configuration used within a tire structure.

FIG. 11D is a side elevational view of the belt of FIG. 11C.

FIG. 32 is a top plan and partial sectional view of an adaptive tire with a non-steered tube bundle support assembly and an external rotary union of the system illustrated in FIGS. 3 and 3B.

FIG. 33 is a side elevational view of the external rotary union illustrated in FIG. 32.

FIG. 34 is a cross sectional view of a portion of the assembly illustrated in FIG. 32, taken along the line 34-34.

FIG. 35 is a top plan and partial sectional view of an adaptive tire with a steered tube bundle support assembly (e.g. a front wheel) and including an external rotary union of the system illustrated in FIGS. 3 and 3B.

FIG. 36 is a side elevational view of the external rotary union illustrated in FIG. 35.

DETAILED DESCRIPTION

Figure 1:
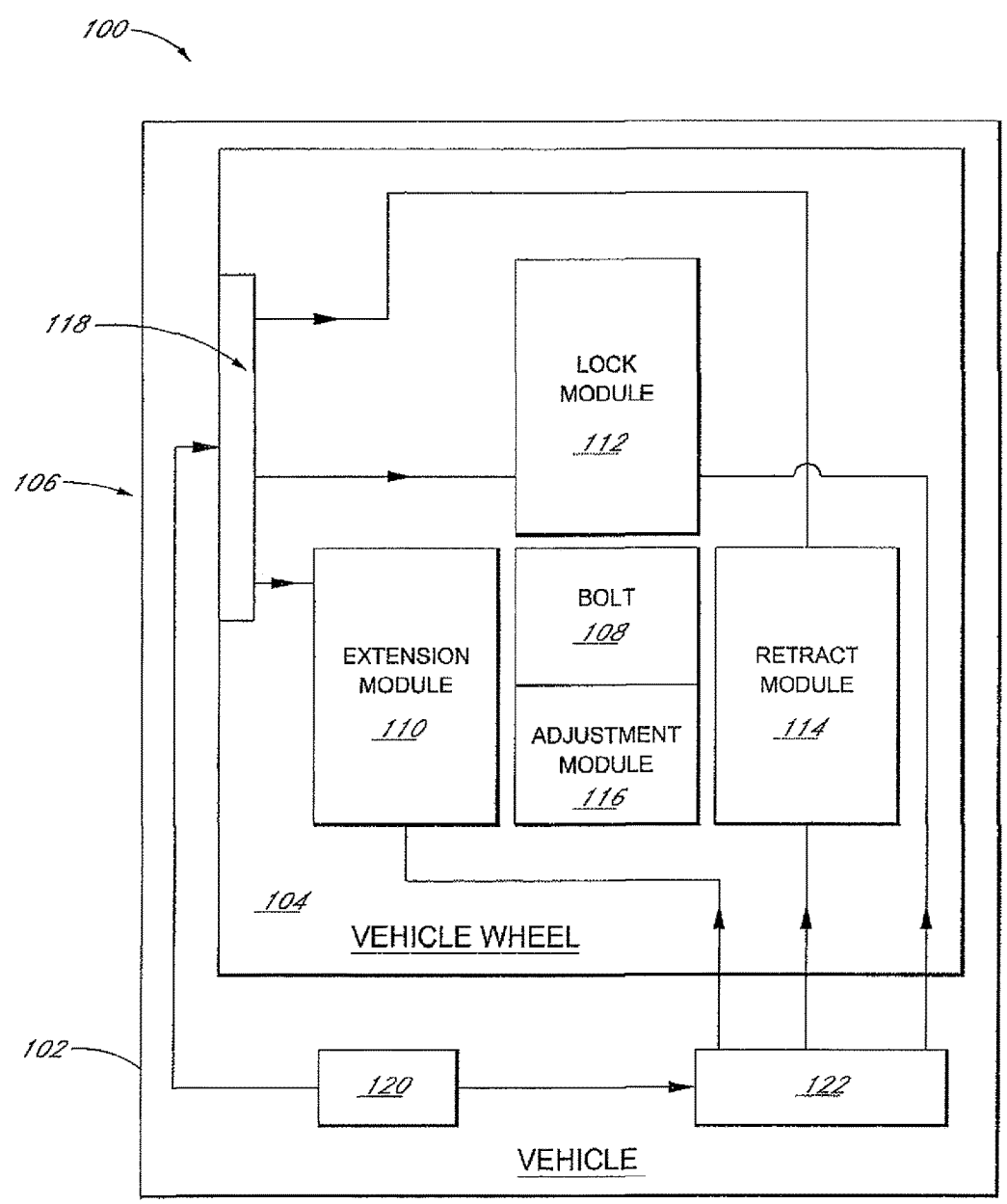
FIG. 1 is a schematic diagram of an adaptive tire system of a vehicle and illustrating a manual control mechanism mounted on the wheel of the associated tire and an optional automatic control system mounted in the vehicle associated with the wheel.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to parts, devices, mechanisms or features being "coupled" together. As used herein, unless expressly stated otherwise, "coupled" means that one part/device/mechanism/feature is directly or indirectly joined to (or directly or indirectly communicates with) another part/device/mechanism/feature.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are described in the context of adaptive tire systems used for improving traction of wheeled vehicles on ice covered roads. Some of the embodiments are described in the context of four-wheeled passenger vehicles. However, the inventions disclosed herein can be used in other contexts as well, for example, but without limitation, trucks, multi-wheel axle trucks, tractor trailers, farm vehicles, recreational off road vehicles, robotics, drone vehicles, etc.

With reference to FIG. 1, an adaptive tire system 100 can include a vehicle 102, a vehicle wheel 104 and a bolt actuation system 106.

The bolt actuation system 106 can include a bolt 108, an extension module 110 and a lock module 112. The bolt 108 can be a generally linear member mounted for reciprocal movement along a radial direction of a tire associated with the vehicle wheel 104. The bolt 108 can be made from any material. However, metals typically provide for reasonable durability. With regard to the reciprocal mounting of the bolt 108, the bolt 108 can be mounted for limited movement within an aperture extending through an outer surface of a tire. More specifically, the bolt 108 can include a distal end and can be mounted such that the distal end of the bolt can be retracted to a position in which it does not protrude beyond an outer surface of a tread of an associated tire and a deployed position in which the distal tip protrudes beyond the outer surface of the surrounding tread.

The lock module 112 can be configured to move between locked and unlocked positions. Additionally, the lock module 112 can be configured to lock the bolt 108 in a deployed position without the need of persistently maintained actuation force, such as compressed air or another source of force. Rather, the lock module 112 can be configured to mechanically maintain the bolt in the extended position and optionally without the need for any persistently or continuously applied energy or force.

Optionally, the lock module 112 can also be configured to lock the bolt 108 in the retracted position. Again, the lock module 112 can be configured to maintain the bolt in a retracted position without the need for persistently or continuously maintained application of energy or air pressure. Additionally, such functionality of the lock module 112 can prevent the bolts from unintentionally being deployed through centrifugal acceleration caused by movement of the wheel 104 and the associated vehicle 102.

The extension module 110 can be configured to provide an actuation force for moving the bolt 108 from a retracted position to the deployed position noted above. Any type of actuator can be used. In the embodiments described below with reference to the remaining figures, the extension module 110 utilizes compressed air for actuation of the bolt 108. However, other types of actuators can also be used.

Optionally, the system 106 can also include a retract module 114. The retract module 114 can be configured to provide an actuation force for moving the bolt 108 from the deployed position to a retracted position. In some embodiments, the retract module 114 can be in the form of a spring. Thus, when the lock mechanism 112 is unlocked, and there is no actuation force provided by the extension module 110, the retract module 114 can return the bolt to the retracted position by action of a spring. Optionally, the retract module 114 can also include an active actuator such as a compressed air actuator or other type of actuator for moving the bolt 108 into the retracted position. This can be beneficial where the force of a spring alone is not sufficient to reliably move the bolt fully into the retracted position. In some embodiments, the retract module 114 can be incorporated into the extension module 110.

The system 106 can also optionally include an adjustment module 116. The adjustment module 116 can be configured to allow the magnitude of protrusion of the bolt 108 from the surrounding tread surface of an associated tire to be adjusted. For example, the bolt 108 can be made in one or more parts including a threaded engagement with another component thereby allowing the amount by which the bolt protrudes from the surrounding tire tread to be adjusted in or out. Further, the adjustment module 116 can include a mechanism for allowing the tips of the bolt 108 to be removed and replaced. For example, the bolt 108 can be made in a plurality of pieces in which the distal-most tip of the bolt 108 is threaded onto an inner portion of the bolt 108 such that the distal tip can be removed and replaced. In some embodiments, the replaceable tips can be made from any material including, for example, but without limitation, steel, titanium, plastic, aluminum, etc.

Optionally, the system 106 can include a manual interface 118 configured to allow a user to manually control the supply of air from an air source 120 to the extension module 110, lock module 112 and the retract module 114.

In some embodiments, the air source 120 can be mounted on the vehicle 102. However, other configurations could also be used.

Further, in the illustrated embodiment, the manual interface 118 is mounted on the vehicle wheel 104. However, other configurations can also be used.

In some embodiments, the system 106 can include an automatic control device 122. For example, the automatic control device 122 can control the automatic deployment and retraction of the bolt 108. For example, the device 122 can be configured, with hard-wired circuitry, a microprocessor/microcontroller, or general purpose computer hardware and actuators for controlling a supply of air from the air source 120 to the extension module 110, lock module 112, and retract module 114. In some embodiments, the control device 122 can include a user input device (not shown) configured to allow a user to perform a single input command for requesting the lock module 112 to unlock the bolt 108 and the extension module 110 to apply an actuation force to move the bolt 108 from the retracted position to the extended position. Similarly, and optionally, the device 122 can include a user input device that allows a user to perform a single input command for requesting retraction of the bolt and to activate the lock module 112 and the retract module 114. As such, a user can extend and retract the bolt 108 with single inputs. Other configurations can also be used.

Figure 2:
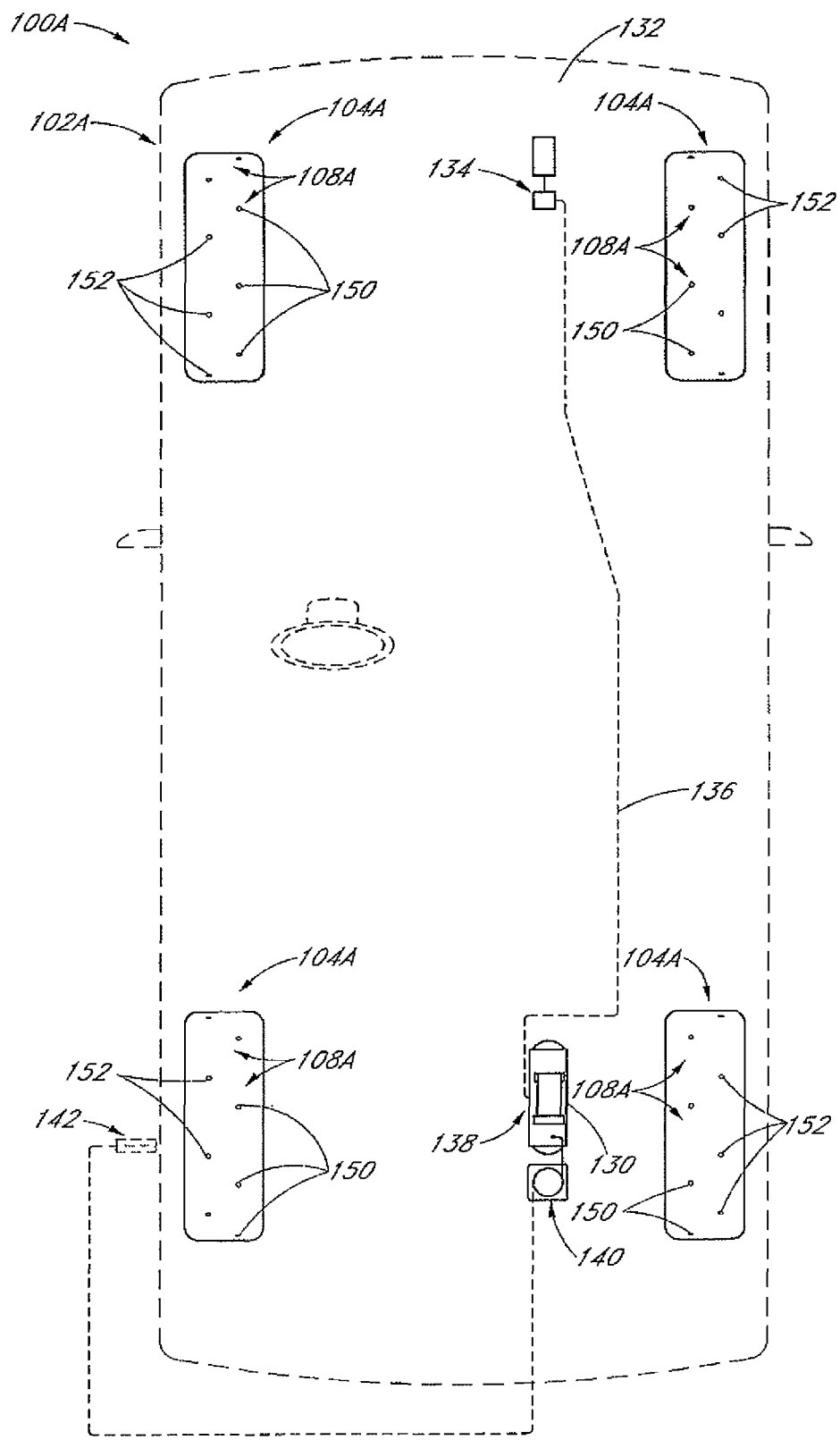
FIG. 2 is a schematic diagram of a vehicle including four adaptive tires, an air compressor, and compressed air distribution devices for facilitating manual operation of the adaptive tires.

FIG. 2 illustrates a further embodiment of the adaptive tire system 100, identified generally below by the reference numeral 100A. The components of the system 100A that are the same or similar to the adaptive system 100 illustrated in FIG. 1 are identified with the same reference numeral, except that "A" has been added thereto. The description set forth above with regard to the system 100 also applied to the similarly designated components of the system 100A.

In the illustrated embodiment, the vehicle 102A is a four-wheeled passenger vehicle having four vehicle wheels 104A.

The system 100A includes a vehicle mounted air compressor 130 connected to a vehicle-mounted power supply, such as a 12-volt power supply 132. In some embodiments, the air compressor 130 can be designed to provide at least about 47 psi compressed air delivered to a reservoir tank. In some embodiments, an inline 30-amp fuse 134 can be included in the circuit connection 136 to the air compressor 130. The air compressor 130 can have a power switch 138 accessible by a user and an air delivery hose 140 from the reservoir. The delivery hose 140 can be sized so that it can extend to all of the wheels 104A of the vehicle 102A. The air delivery hose 140 can include an air shut off insert 142 at its distal end for delivering compressed air to the components within the wheels 104A, described in greater detail below. The shut off insert 142 can be any type of shut off insert which are well-known in the art.

Similarly to the system 100, in FIG. 1, the system 100A, in FIG. 2, can include a plurality of extendable and/or retractable bolts 108A on each of the wheels 104A. The bolts 108A can be arranged along a single circumferential line around each of the wheels 104A. In the illustrated embodiment, the bolts 108A are arranged around two circumferential lines, parallel to one another, thereby defining two groups of bolts provided by an inner set of bolt assemblies 150 and an outer set of bolt assemblies 152. The inner and outer bolt assemblies 150, 152 can be configured to extend or retract the bolts 108A simultaneously. Additionally, the inner and outer bolt assemblies 150, 152 can be identical or similar to each other. However, other configurations and actuation procedures can also be used.

Figure 2A:
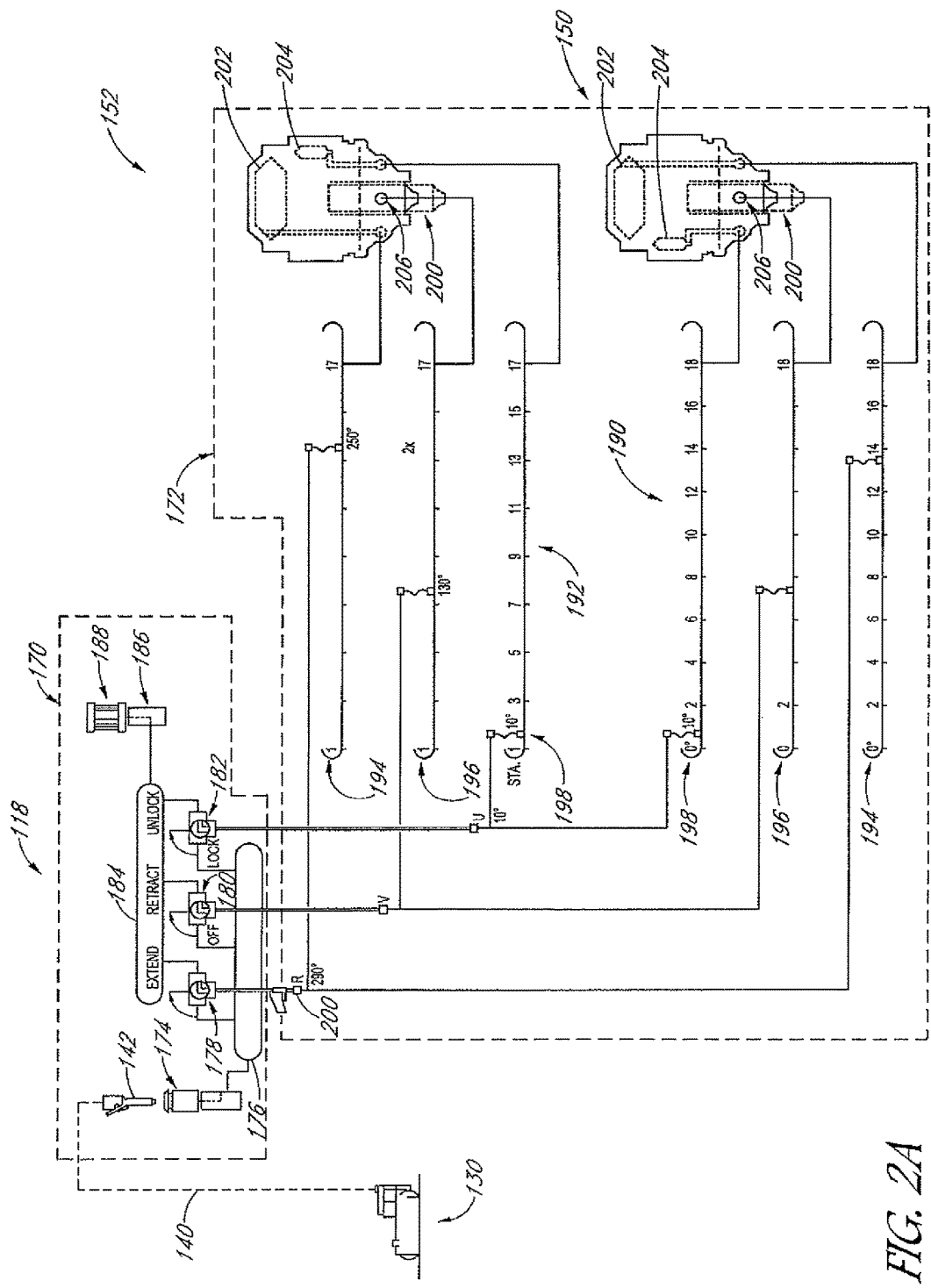
FIG. 2A is a schematic diagram illustrating various pneumatic connections and actuators included in the system illustrated in FIG. 2.

FIG. 2A schematically illustrates the system 100A including two portions of the wheel 104A; the rigid portion of the wheel 104A referred to herein as wheel 170, also commonly referred to as a "rim" and a tire 172. The wheel 170 can include inputs for a user to manually control deployment and retraction of the bolt assemblies 150, 152. As illustrated in FIG. 2A, several components can extend from the wheel 170 into the tire 172 to provide actuation to the bolt assemblies 150, 152.

With continued reference to FIG. 2A, the wheel 170 can include one or more pipe couplers 174 configured to receive pressurized air from the shut off insert 142. The pipe couplers 174 can be connected to a pressure reservoir 176, which can be in the form of a chamber or loop of tubing or hose. Other configurations can also be used. The pressure reservoir 176 can be connected to three valves 178, 180, 182 which are configured to selectively connect the reservoir 176 with either internal air circuits within the tire 172 or a vent reservoir or vent loop 184. The vent reservoir 184 is connected to a vent discharge port 186, which can optionally include an outlet filter 188 configured to discharge air from the loop 184 to the atmosphere and to filter air entering from atmosphere.

In the orientations illustrated in FIG. 2A, all of the valves 178, 180, 182 connect the air circuits internal to the tire 172 to the vent loop 184 and thus to the atmosphere. In this position, none of the bolt assemblies 150, 152 can receive any internal actuation forces. In some embodiments, the bolt assemblies 150, 152 are biased towards a retracted, locked state. Thus, with valves 178, 180, 182 in the positions illustrated in FIG. 2A, the bolt assemblies 150, 152 would remain in a retracted, locked state. However, other configurations of bolt assemblies 150, 152 can also be used.

The valves 178, 180, 182 are movable to at least one other position. For example, the valves 178, 180, 182 are configured to be rotated clockwise by 90 degrees. In that configuration, the valves 178, 180, 182 connect the reservoir 176 with the internal plumbing of the tire 172. Selective actuation in the valves 178, 180, 182 can provide desired locking, unlocking, retraction, and extension of the bolt assemblies 150, 152, described in greater detail below.

With continued reference to FIG. 2A, the tire 172 can include a set of inner actuator manifolds 190 and a set of outer actuator manifolds 192. As used herein, "inner" refers to inboard side of tire, and "outer" refers to outboard side of tire, both with reference to vehicle center line along an axis of vehicle forward or reverse motion. The manifolds 190, 192 can be in any configuration and can be configured for supplying any type of actuation force to the inner and outer bolt assemblies 150, 152, respectively. In the illustrated embodiments, the manifold sets 190, 192 include three pneumatic reservoirs or tubing loops corresponding to the three valves 178, 180, 182. More specifically, the manifolds 190, 192 each include an extend manifold 194, a retract manifold 196 and an unlock manifold 198. Retract manifold 196 can also serve as a vent manifold.

The extend manifolds 194 are connected to the valve 178 with a wheel rim fitting 200. Similarly, the retract and unlock manifold 196, 198 are also connected to valves 180, 182, respectively, with similar wheel rim fittings, unions, and other types of hose or connectors that can be readily applied by one of ordinary skill in the art.

The manifolds 194, 196, 198 can extend circumferentially within the tire 172, parallel to each other. Further, optionally, each of the manifold sets 190, 192 can be connected to a plurality of bolt assemblies 150, 152 in an aligned or offset configuration. In the illustrated embodiment, each of the manifold sets 190, 192 are connected to nine inner and outer bolt assemblies 150, 152, respectively.

With continued reference to FIG. 2A, the inner and outer bolt assemblies 150, 152 can comprise bolt actuators. Each of these bolt actuators can include a movable bolt 200, an extension mechanism 202, an unlocking and locking mechanism 204 and a retraction mechanism 206.

Each of the extend manifolds 194 are connected to the respective inner and outer extension mechanisms 202 of the inner and outer bolt assemblies 150, 152. In some embodiments, the extension mechanisms 202 can be diaphragm mechanisms which expand when subjected to pressurized air and thereby generate an actuation force. In the illustrated embodiment, the extension mechanisms 202 exert a linear, downward force against the movable bolts 200. As described in greater detail below, the movable bolts 200 slideably move within the bolt assemblies 150, 152 and are spring biased towards a retracted (upward) position. Thus, when the valve 178 is rotated 90 degrees from a position illustrated in FIG. 2A, thereby guiding pressurized air to the manifolds 194, pressurized air enters the extension mechanisms 202 and thereby urges the bolts 200 toward the extended position (phantom line in FIG. 2A). However, the unlocking and locking mechanism 204, described in greater detail below, must be in an unlocked position before the movable bolts 200 can move.

The manifolds 196 are connected to the unlocking and locking mechanisms 204. Similarly to the extension mechanisms 202, the unlocking and locking mechanism 204 can be in the form of a diaphragm device which, when subjected to pressurized air from manifolds 198, generate an actuation force which presses against a movable locking member (described in greater detail below). In some embodiments, the locking member can be biased towards a lock position. Thus, the unlocking and locking mechanism 204 can be configured to, when provided with an actuation force, move the locking member toward an unlock position. Thus, if valve 182 first and then valve 178 are rotated 90 degrees from a position illustrated in FIG. 2A, thereby providing pressurized air to the manifolds 198, 194, the locking member within the bolt assemblies 150, 152 would be moved to the unlock position and the extension mechanisms 202 would urge the movable bolts 200 to the extended position illustrated in phantom line in FIG. 2A.

The retract manifolds 196 are connected to a retraction mechanism 206 in the bolt assemblies 150, 152. The retraction mechanism 206, in some embodiments, can be incorporated into the extension mechanism 202, for example, utilizing the same diaphragm to provide a retraction force. For example, the retraction mechanism 206 can include air passages for communicating air in the retract manifold 196 to the opposite side of the diaphragm used to provide the extension movement performed by the extension mechanism.

In operation, with removable bolts 200 in either the deployed or retracted position, the valves 178, 180, 182 can be left in the position illustrated in FIG. 2A, where all manifolds 194, 196, 198 are vented to the vent reservoir 184. As such, the lock mechanism (described in greater detail below) included in the bolt assemblies 150, 152 lock the movable bolts 200 into an existing position and do not require any continued or persistent application of actuation force or energy.

If a user wishes to change the position of the movable bolts 200, a user can manually connect the air supply shut off insert 142 to the coupler 174 and rotate valve 182 90 degrees clockwise from the position illustrated in FIG. 2A. Such a movement of the valve 182 connects pressurized air within the reservoir 176 with the manifolds 198. Thereafter, pressurized air flows into the unlocking and locking mechanisms 204 to thereby unlock the bolts 200 from their position. If the bolts 200 are in the retracted position, the user can rotate the valve 178 90 degrees clockwise from the position illustrated in FIG. 2A to thereby provide pressurized air to the manifolds 194. Pressurized air from the manifolds 194 will then flow into the extension mechanisms 202 and thereby urge the bolts 200 from retracted to extended positions. Thereafter, the user can then rotate the valve 182 counter-clockwise to the position illustrated in FIG. 2A, thereby allowing the pressurized air to vent from the unlocking and locking mechanisms 204 and thereby allowing the unlocking and locking leek mechanism 204 to return to its locked position towards which it is spring biased. The user can then return the valve 178 to the position illustrated in FIG. 2A and disconnect the shut off insert 142.

On the other hand, if the bolts 200 are in the deployed position or extended position and the user desires to retract the bolts 200, the user can move the valve 182 to the unlock position (90 degrees clockwise from the position illustrated in FIG. 2A) and also rotate the valve 180 90 degrees clockwise from the position illustrated in FIG. 2A. As such, pressurized air will flow into both the unlock manifolds 198 and the retract manifolds 196, thereby urging the bolt 200 towards its retracted position. As noted above, the bolt assemblies 150, 152 can optionally include springs to bias the bolts 200 toward a retracted position. Thus, in some embodiments, or under certain circumstances, it may not be necessary to use the retract valve 180 to retract the bolts. Friction between the bolt assembly and lock cams during pressure retraction is minimized by sloped surfaces of bolt assembly and lock cam, described in greater detail below with reference to FIG. 27. Finally, in order to maintain the bolts 200 in the retracted position, the user can return the lock valve 182 to the position illustrated in FIG. 2A, thereby allowing the pressurized air to bleed out of the unlocking and locking mechanisms 204 allowing the lock member (described below) to return to a locked position.

Figure 3:
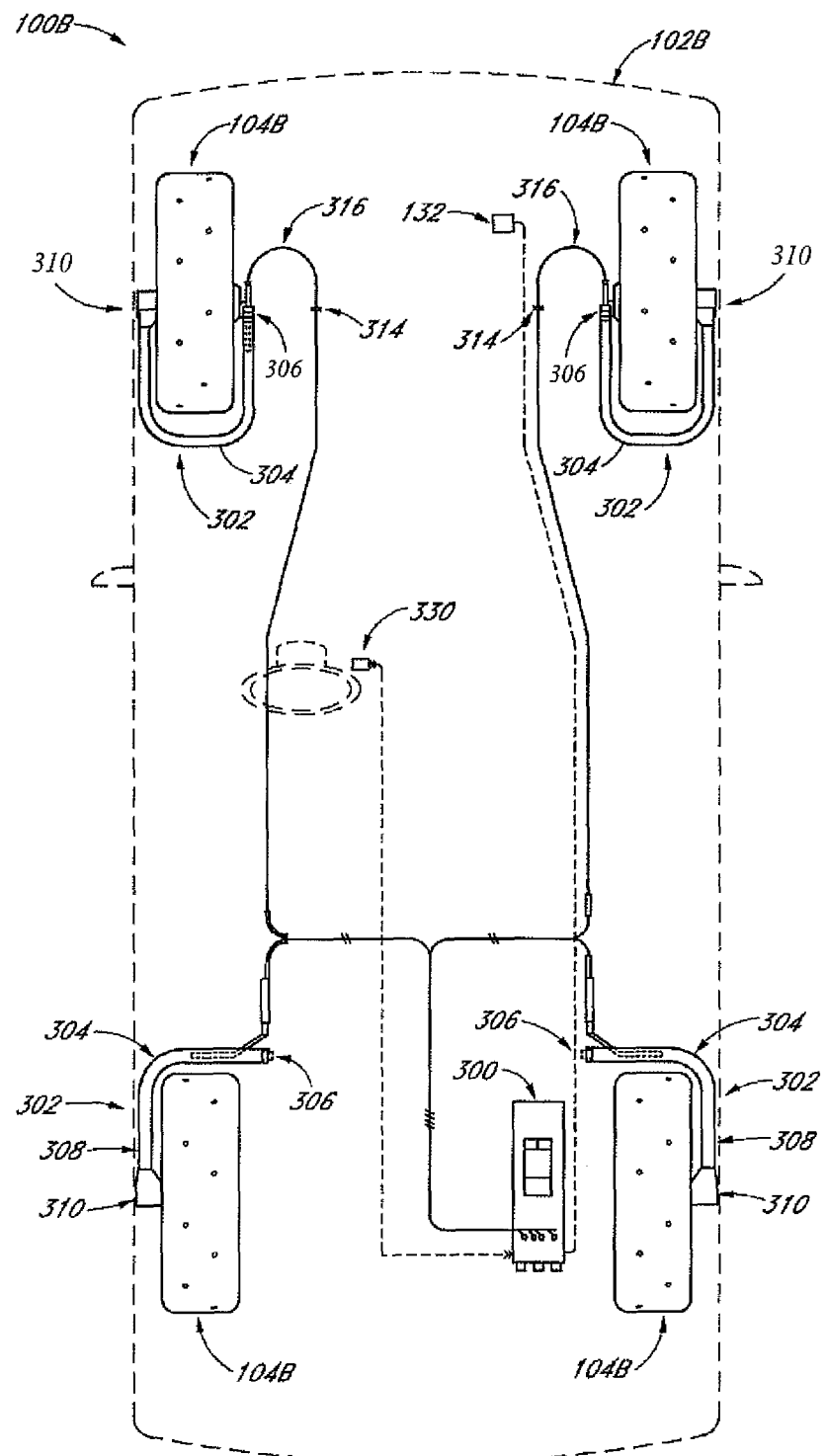
FIG. 3 is a schematic diagram of another embodiment of an adaptive tire system of a vehicle incorporating four adaptive tires and external multiple passage rotary unions for providing actuating air to the actuators within each tire.

FIG. 3 illustrates a further modification of the systems 100, 100A, identified generally by the reference numeral 100B. The components of the embodiment 100B set forth below that are the same or similar to the corresponding components of the embodiments 100, 100A described above, are identified with the same reference numeral except that a "B" has been added thereto. The components of the system 100B that are not described in detail below can be assumed to be the same or similar to those described above with reference to the systems 100, 100A.

With continued reference to FIG. 3, the system 100B can include an automated air delivery subsystem 300. The subsystem 300 can include a compressed air source 138 (FIG. 2) or another type of source of actuator forces.

The system 100B also includes rotary union assemblies 302 associated with each of the wheels 104B. The rotary union assemblies 302 are configured to divert actuation forces from the subsystem 300 to the wheels 104B by using pivotable actuator lines mounted on the exterior side of the wheels 104B guiding the actuator forces through a rotary union 310 disposed at the hub of the wheels 104B. More specifically, with continued reference to FIG. 3, the rotary union assemblies 302 include tube bundles 304 each of which can include a plurality of flexible pneumatic tubes disposed within a steel tube frame, and which are connected to the subsystem 300, and the source of compressed air disposed therein. The pivotable tube bundles 304 associated with the rear axle of the vehicle 102B can include proximal ends 306 that are fixed to the vehicle frame or body. The distal ends 308 of the flexible tube bundles 304 can be fixed to rotary union units 310 disposed at the outer sides of each of the wheels 104B. During operation, as the wheels 104B move up and down, the flexible tube bundles 304 and metal tube frames pivot, twist and bend to accommodate movement of the wheels 104B.

The flexible tube bundles 304 associated with the front wheels can include proximal ends 306 mounted to a portion of the suspension of the vehicle 102B near the inner side of the hub of the wheel 104B. These flexible tube bundles 304 can extend around the wheels 104B to rotary unions 310 disposed on the outer sides of the wheels 104B associated with the front of the vehicle 102B. An additional fixed mount 314 can be provided for each side of the vehicle associated with the front wheels for fixing additional lengths of flexible lines connecting the flexible bundles 304 with the subsystem 300. In this configuration, the flexible tube bundles 304 pivot left and right with steering movements of the wheels 104B, and the additional lengths of hose 316 can flex to accommodate the up-and-down movements of the front wheels 104B.

Figure 3B:
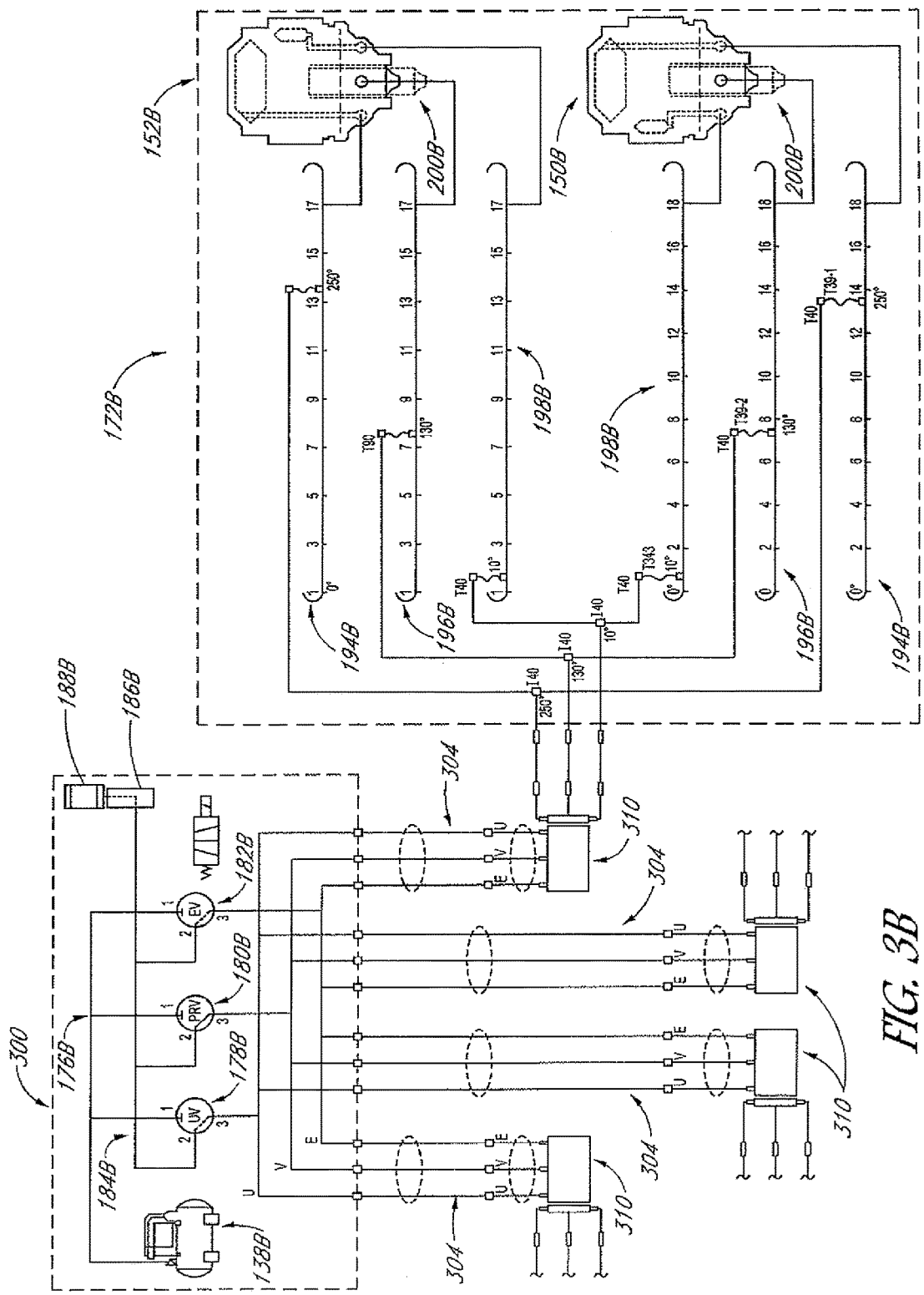
FIG. 3B is a schematic diagram of the adaptive tire system illustrated in FIG. 3.

As shown in FIG. 3B, the subsystem 300 (FIG. 3) can include an air compressor 138B, a reservoir 176B and a plurality of valves 178B, 180B, 182B, configured for controlling the supply of air for extension, retraction, and unlocking, respectively. The subsystem 300 can include actuators (not shown) configured to electronically operate the valves 178B, 180B, 182B. Any type of actuator known in the art can be used for such actuation. For example, the subsystem 300 can include a hard-wired controller, a microprocessor controller, a programmable logic controller, or a general purpose computer and processor with an appropriate operating system and software coding for performing any of the functions described above or below. In some embodiments, the valves 178B, 180B, 182B, are linear sliding-type valves which rely on linear actuators for creating and cutting off connections between the various supply and discharge lines.

As reflected in FIG. 3B, the subsystem 300 includes four parallel bundled outputs for feeding actuation air to the rotary unions 310.

With continued reference to FIG. 3B, the subsystem 300 can be configured to sequentially operate the valves 178B, 180B, 182B, to perform the functions of retraction and extension. For example, the subsystem 300 can be programmed (and/or hard-wired) to respond to a user input, for example, user input device 330 (FIG. 3). The user input device 330 can include, for example, two or more positions; a first position for requesting retraction and a second position for requesting extension.

The subsystem 300 can be programmed, as is well within the skill of one in ordinary skill in the art, to perform the following steps upon detection of a request for retraction and extension.

When the user input 330 is actuated to request extension, the subsystem 300 can sequentially move valve 182B to connect the reservoir 176B to the unlock manifold 198B. This will, as described above, unlock the bolt assemblies 150B, 152B. With the valve 182B maintained in the activated position noted above, the subsystem 300 can then activate valve 178B to connect the extend manifolds 194B to the bolt assemblies 150B, 152B. As such, the movable bolts 200B would then be urged to the extended position (phantom line in FIG. 3B).

The subsystem 300 can then sequentially deactivate the valves 182B, 178B. More specifically, the subsystem 300 can, with the movable bolts 200B held in the extended position through the continued application of high-pressure air from the compressor 138B and/or reservoir 176B, the valve 182B can then be deactivated, i.e., moved to the position illustrated in FIG. 3B, so as to allow pressurized air from the unlocking manifold 198B to be vented through the vent 186B and, optionally, filter 188B. Thus, the locking mechanisms within the bolt assemblies 150B, 152B, will move, under their bias, to the locked position. After the bolt assemblies 150B, 152B, change state to the locked state, the valve 178B can be deactivated, i.e., moved to the position illustrated in FIG. 3B, to allow high-pressure air to vent through the vent 186B and, optionally, filter 188B.

On the other hand, if the bolt assemblies 150B, 152B, are in the extended position and a retraction request is detected at the user input 330, the subsystem 300 can operate valve 182B to unlock and then retract by spring bias the moveable bolts 200B. Optionally, upon detection of the pressure retraction request at the user input 330, the subsystem 300 can activate valve 182B, as noted above, to unlock the bolt assemblies 150B, 152B. With the bolt assemblies 150B, 152B, maintained in an unlocked position, the subsystem 300 can then activate valve 180E to thereby connect the retraction manifolds 196B with the reservoir 176B so as to drive the moveable bolts 200B toward the retracted position.

After the moveable bolts 200B have been moved to the retracted position, the subsystem 300, while maintaining valve 180B in the activated state, can move the valve 182B back to the deactivated state, thereby connecting the unlock manifolds 198B to the vent 186E so as to vent the pressurized air to the atmosphere, optionally through the filter 188B.

As such, the bolt assemblies 150B, 152B, will move to the locked positions, as noted above, under the bias of the locking mechanisms included in the bolt assemblies 150B, 152B.

Thereafter, the subsystem 300 can optionally deactivate the valve 180B to thereby connect the retraction manifolds 196B with the vent 186B.

With regard to the function of extension of the moveable bolts 200B, the subsystem 300 can be activated during operation of the vehicle, i.e., during rotation of the wheels 104B. As such, during operation, large centrifugal accelerations are generated and act on the moveable bolts 200B. Thus, such centrifugal acceleration can be utilized to assist or entirely perform or apply the necessary actuation forces for moving the moveable bolts 200B from the retracted position to the extended position.

The use of the rotary unions 310 allow the system to be configured to be operated by an operator of the vehicle from inside the vehicle while wheels are rotating as compared to operated by using an exterior pressure line while vehicle is stopped. Thus, the rotary unions 310 provide a highly desirable mode of operation which minimizes the need for user manual manipulation of valves, application of pressurized air or user exposure to weather.

Figure 4:
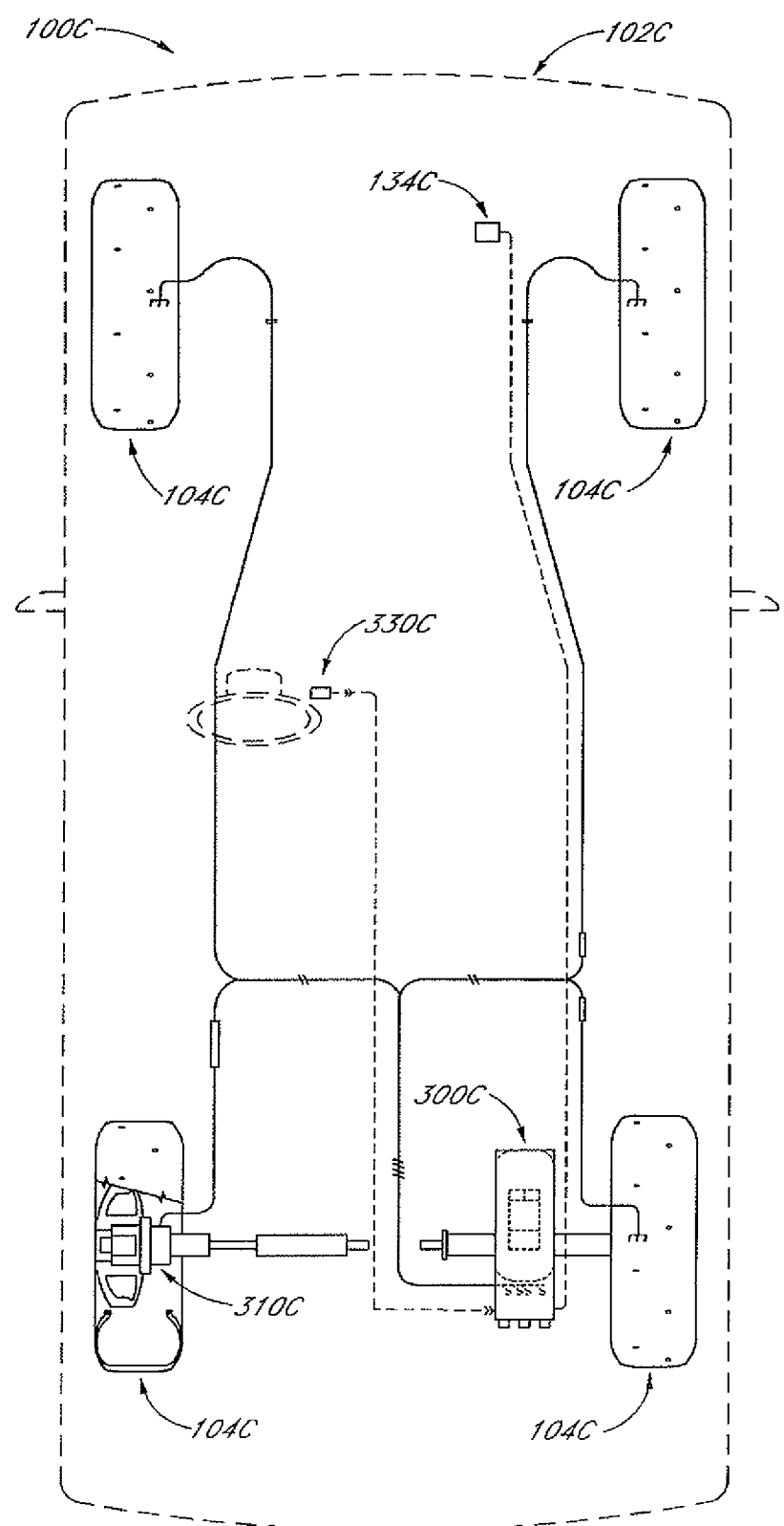
FIG. 4 is a schematic diagram of a vehicle including four adaptive tires and an automatic actuation system incorporating internal multiple passage rotary unions for delivery of actuation air to the actuators within the adaptive tires.

FIG. 4 illustrates yet another modification of the systems 100, 100A, 100B, and is identified generally by the reference numeral 100C. The components of the system 100C, which are the same or similar to the components of the systems 100, 100A, or 100B, are identified below with the same reference numeral, except that a "C" has been added thereto.

With continued reference to FIG. 4, the system 100C includes internal, hub-mounted rotary unions 310C. The rotary unions 310 and 310C are both configured to provide a plurality of compressed air connections through a spinning joint. Additionally, the use of the internal rotary unions 310C avoids the additionally and potentially undesirable appearance of the rotary unions on the outside of the wheels 104C that results from the configuration of the system 100B.

Figure 5:
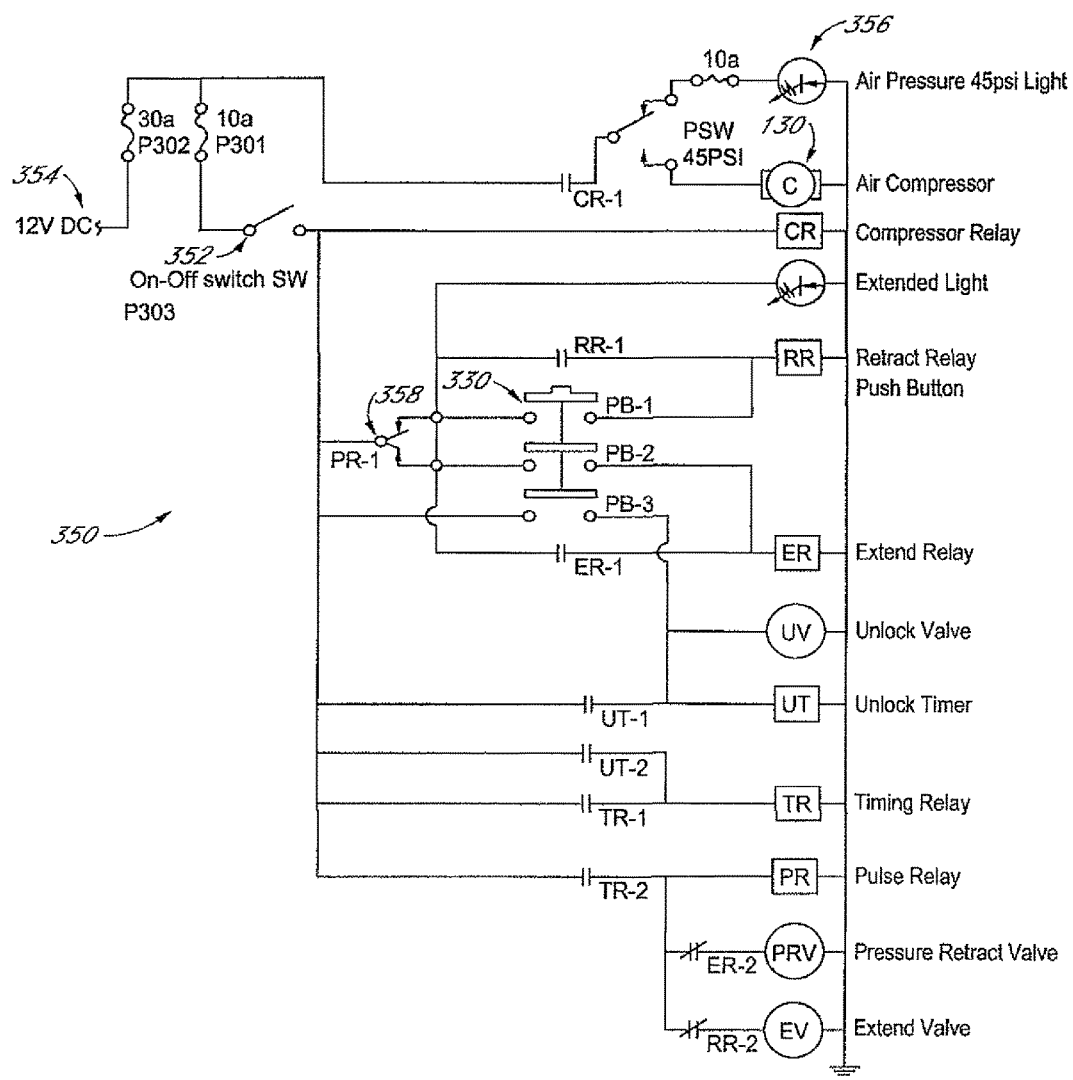
FIG. 5 is a schematic circuit diagram illustrating a hardwired circuit that can be incorporated into the systems for FIGS. 3 and 4 for performing extension and retraction operations.

With reference to FIG. 5, the subsystems 300 and 300C can include a hard-wired controller 350 configured for activating the valves and performing the methods described above. Some of the components are identified with functional block representations and such components' construction, and operation thereof, is well understood by those of ordinary skill in the art. Additionally, a more detailed description of the components and operation of the controller 350 of FIG. 5 is set forth in U.S. Provisional Patent Application No. 61/691,076 filed Aug. 20, 2012 and U.S. Provisional Patent Application No. 61/691,222 filed Aug. 20, 2012, the entire contents of both of which is noted above.

As shown in FIG. 5, the controller 350 can include a power switch 352 connecting the controller 350 with a power source 354. Wired in the configuration illustrated in FIG. 5, the power switch 352, when closed, powers on the air compressor 130 and the air compressor light 356. Otherwise, the remainder of the controller 350 remains off, until a user activates the button 330.

The circuit of the controller 350 also includes a flip-flop relay 358. The flip-flop relay 358 allows for the controller 350 on each successive operation to automatically switch between retract and extend modes. In the position illustrated in solid line in FIG. 5, the flip-flop relay 358 is in the retract mode. Thus, when the button 330 is depressed, the retract relay "RR" as well as the unlock valve "UV", the unlock timer "UT", and the timing relay "TR" are connected to the power supply 354. As such, the controller 350 can sequentially operate valves 182B and 180B to perform a bolt retraction operation, as described in greater detail below. At the end of the retraction operation, the flip-flop relay 358 moves to the downward position illustrated in phantom line in FIG. 5.

When the button 330 is depressed with the flip-flop relay 358 in the down position (phantom line), the extend relay "ER" is connected to the power supply along with the unlock valve "UV", the unlock timer "UT", and the timing relay "TR". As such, the controller 350 sequentially operates the valves 182B and 178B to perform an extend operation, described in greater detail below.

With regard to FIG. 5, the timing diagrams for unlocking and operating the valves described above with regard to the retraction and extension methods, is set forth therein. These timings are examples of timings that can be used with the systems 300, 300C. However, other timing schemes and scenarios can also be used. As reflected in the timing diagram of FIG. 6A, during operation, the controller 350 initially energizes the unlock valve "UV" which corresponds to valve 182B (FIG. 3B). Some time elapses as the air flows through the valve 182B and into the unlock manifold 198B before the bolt assemblies 150A, 152B are fully unlocked. Thus, the controller 350 waits or delays until t1 seconds have elapsed after the unlock valve 182B has been energized before energizing either extend or retract valve 178B or 180B. This is to allow lock mechanisms within bolt assemblies 150B, 152B to reach a fully unlocked state before an attempt is made to move the bolts 200B. Additionally, the controller 350 waits or delays until extend or retract valves have been energized for at least t2 seconds before de-energizing lock valve 182B. This provides a time allowance plus a margin that the bolt has completed the desired movement before the locking device within 150B, 152B moves back into a locked position. Finally, the controller 350 waits or delays until t3 seconds have elapsed before venting the extend or retract manifolds 194B 196B. The controller 350 accomplishes the delays associated with the durations T1, T2, T3 noted above by using the unlock timer "UT", and the timing relay "TR". These types of devices are well known in the art and can include adjustment screws for changing the magnitudes of the times t1, t2, and t3 noted above. The appropriate magnitudes of the times t1, t2, and t3 can be determined through routine optimization. The magnitudes of the times t2, and t3 may be in the range of approximately 600 ms to 2 full seconds. These magnitudes can vary depending on the geometry of different components within the system and thus one set of magnitudes of the times t1, t2, and t3 may not be appropriate for all embodiments. Additionally, methods of operation of the systems 300, 300C are further described with reference to the control routines illustrated FIGS. 6B 6C.

Figure 6A:
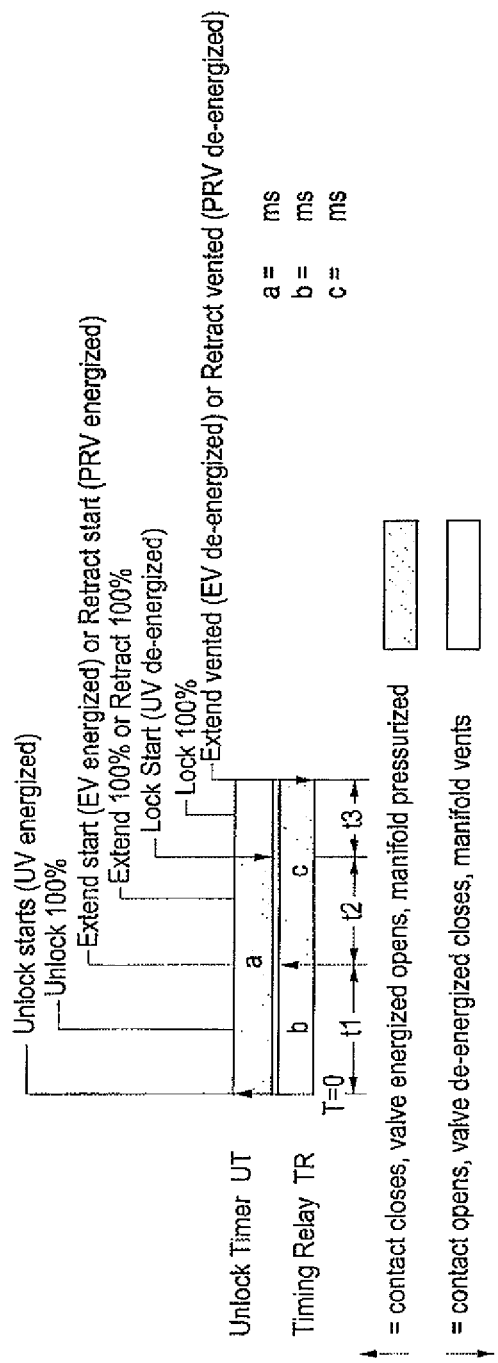
FIG. 6A is a timing diagram of FIG. 5 components illustrating optional timings for actuation of valves with regard to the methods of retraction and extension that can be performed by the systems of FIGS. 3 and 4.
Figures 6B, 6C:
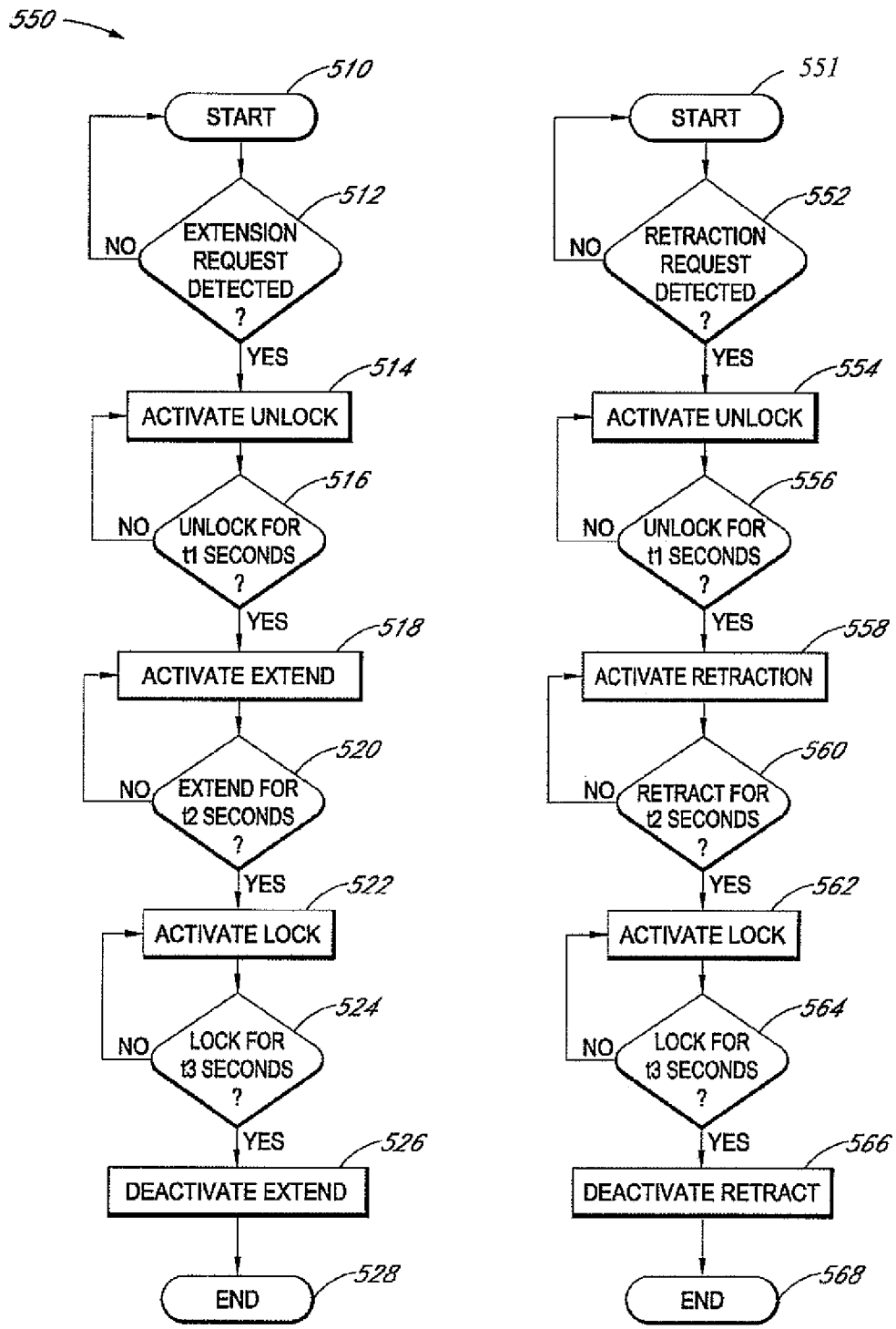
FIG. 6B is a flow chart illustrating a control routine for bolt extension that can be performed by the air supply systems illustrated in FIGS. 3-3B, and 4.
FIG. 6C is a flow chart illustrating a control routine for bolt retraction that can be utilized by the air supply systems illustrated in FIGS. 3-3B, and 4.

FIGS. 6B and 6C illustrate control routines that can be utilized by the air supply systems 300, 300C illustrated in FIGS. 3 and 4 where such systems can include microprocessor, general purpose computer control or adjustable timing relays such as those illustrated in FIG. 6A. Additionally, the flow charts set forth in FIGS. 6B and 6C can represent methods of operation that are performed by hard-wired embodiments, such as that illustrated in FIGS. 5 and 6A above.

FIG. 6B illustrates a control routine 550 which is configured to extend the moveable bolts 200. The control routine 550 can start operation at start block 510. After the start block 510, the control routine 550 can move on to decision block 512.

In the decision block 512, it is determined whether an extension request has been detected. For example, the subsystem 300 can monitor the user input 330, 330C (FIGS. 3 and 4) to determine if a user or operator of the associated vehicle 102B, 102C has activated the user input 330, 330C to request an extension operation. If it is determined that an extension request has not been detected, the control routine 550 can return to start block 510.

On the other hand, if it determined, in the decision block 512, that a user has requested an extension operation, the control routine 550 can move on to operation block 514.

In the operation block 514, an unlock operation can be activated. For example, the subsystem 300, 300C can activate valves 182B, to provide pressurized air to the unlock manifolds 198B to thereby begin an unlock operation. After the operation block 514, the control routine 550 can move on to decision block 516. In the decision block 516, it can be determined if the unlock operation has been performed for at least a minimum amount of time, for example, t1 seconds. For example, the subsystems 300 can determine if the valves 182B have been energized or activated for at least the predetermined number of seconds ("t1"). If it is determined that the unlock operation has not been performed for at least the threshold amount of time, the control routine 550 can return to operation block 514 and continue. On the other hand, if it is determined in decision block 516 that the unlock operation has been performed for the minimum amount of time, the control routine 550 can move on to operation block 518. This portion of the control routine 550 is reflected in the timing diagram of FIG. 6A where it is indicated that an unlock begins "(UV energized)", subsequently, the unlock operation reaches 100% and then after a time t2, an extension operation begins.

Thus, in operation block 518, an extension operation can be activated. For example, the subsystems 300, 300C can activate valves 178B to thereby provide pressurized air to the extend manifolds 194B. As such, the moveable bolts 200, 200B will begin to move toward an extended configuration. After the operation block 518, the control routine 550 can move on to decision block 520.

In the decision block 520, it can be determined if the extend operation has been performed for a threshold amount of time, such as "t2" seconds. If it is determined that the extend operation has not been performed for at least t2 seconds, the control routine 550 can return to operation block 518 and continue. On the other hand, if it is determined that the extend operation has continued for at least t2 seconds, the control routine 550 can move on to operation block 522.

In the operation block 522, a lock operation can begin. For example, but without limitation, the subsystem 330 can de-energize valves 178B and then 182B so as to allow locking manifolds 198B to vent to the atmosphere through the vent 186B and optionally the filter 188B. As such, the unlocking and locking mechanism (described in greater detail below) can move back to the locked position towards which it is biased. However, other locking mechanisms can also be used. After the operation block 522, the control routine 550 can move on to decision block 524.

In the decision block 524, it is determined if the activate lock function has been performed for at least t3 seconds. If it is determined that the activate lock operation has not been performed for at least t3 seconds, then the control routine 550 can return to operation block 522 and continue. On the other hand, if it is determined in decision block 524 that the activate lock operation (de-energize unlock valve) has continued or occurred for at least t3 seconds, the control routine 550 can move on to operation block 526.

In the operation block 526, the extend operation can be deactivated. For example, the subsystem 300 can de-energize valves 178B so as to allow the extend manifolds 194B to vent to the atmosphere. As such, the moveable bolts 200, 200B will remain in the locked extended position, however, the pressure will be vented out of the extend manifolds 194B.

After the operation block 526, the control routine 550 can move on to end block 528, and optionally return to start block 510 and run continuously in that fashion.

FIG. 6C illustrates a control routine which can be utilized by the control systems 300, 300C to retract the moveable bolts 200B. The operations and decisions performed within the control routine of FIG. 6C are essentially the same as those set forth in the control routine 550, except that instead of the extend valves 178B and extend manifolds 194B being pressurized and vented to the atmosphere, the retract valves 180B and retract manifolds 196B are activated and charged with pressurized air then vented to the atmosphere in the same manner that the extend valves and manifolds are operated in the control routine 550. Thus, the steps 551, 552, 554, 556, 558 560, 562, 564, 566, and 568 are not described in greater detail herein. Rather, one of ordinary skill in the art can fully understand how the control routine of FIG. 6C can operate.

The above circuit and timing diagram of FIGS. 5A and 6A and control routines of FIGS. 6B and 6C provide advantageously smooth operation of retract and extend operations for the moveable bolts 200, 200B. This is because these mechanical components need some time to move, as does the pressurized air in the systems 300, 300B. Thus, by allowing for detecting or determining whether certain minimum threshold amounts of time have passed before moving on to subsequent operations, sufficient time is allowed for these mechanical components and air to move into and pressurize the previously vented passages and manifolds so that the subsequent steps can be completed smoothly and without colliding components into one another or causing unnecessarily large friction among moving components.

Figures 7, 8:
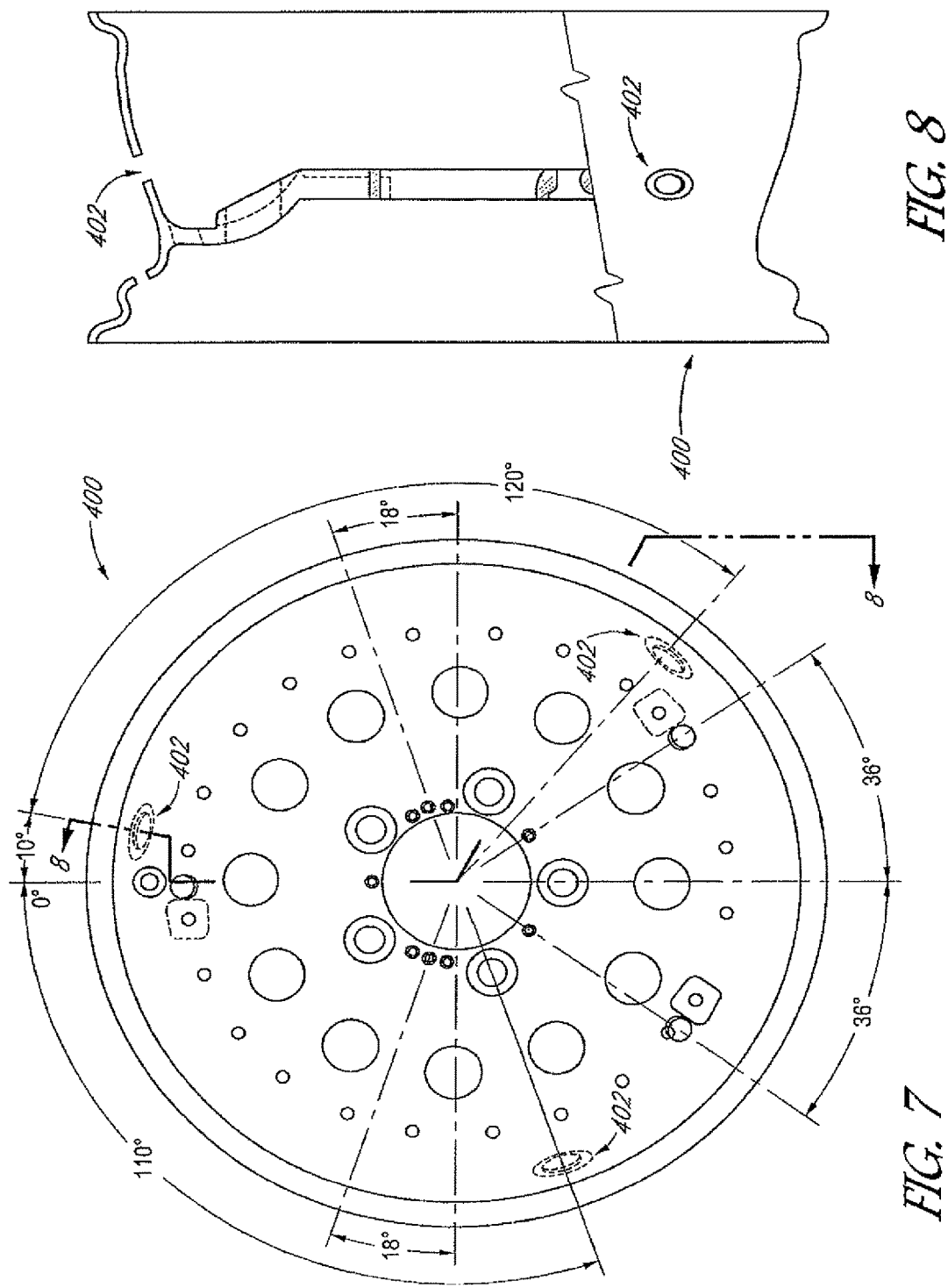
FIG. 7 is a front elevational view of a wheel including apertures configured for accommodating hardware of an adaptive tire system such as those of FIGS. 1-4.
FIG. 8 is a side elevational and partial cross sectional view of the wheel of FIG. 7 taken along line 8-8 of FIG. 7.

FIGS. 7 and 8 illustrate a sample wheel or "rim" 400 that can be used as a center rigid portion of any of the wheels 104, 104A, 104B, 104C.

The wheel 400 can include a plurality of apertures for accommodating the air circuit tubing and hardware illustrated in FIGS. 1-4. For example, the wheel 400 can include apertures 402 for accommodating connections from the manual user interface 118 (FIG. 1), or the rotary unions 310, 310C into the interior of the wheel 400. As described in greater detail below, appropriate seals would be used in conjunction with the apertures 402 to maintain an air-tight seal for the wheel 400 for inflation purposes. The wheel 400 can include various other apertures not described in greater detail herein, for accommodating other components described below.

Figure 10:
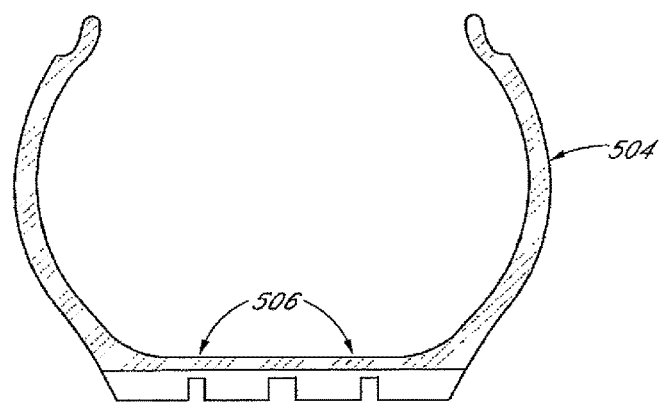
FIG. 10 is a cross sectional view of the tire of FIG. 9, taken along line 10-10.
Figures 9, 11:
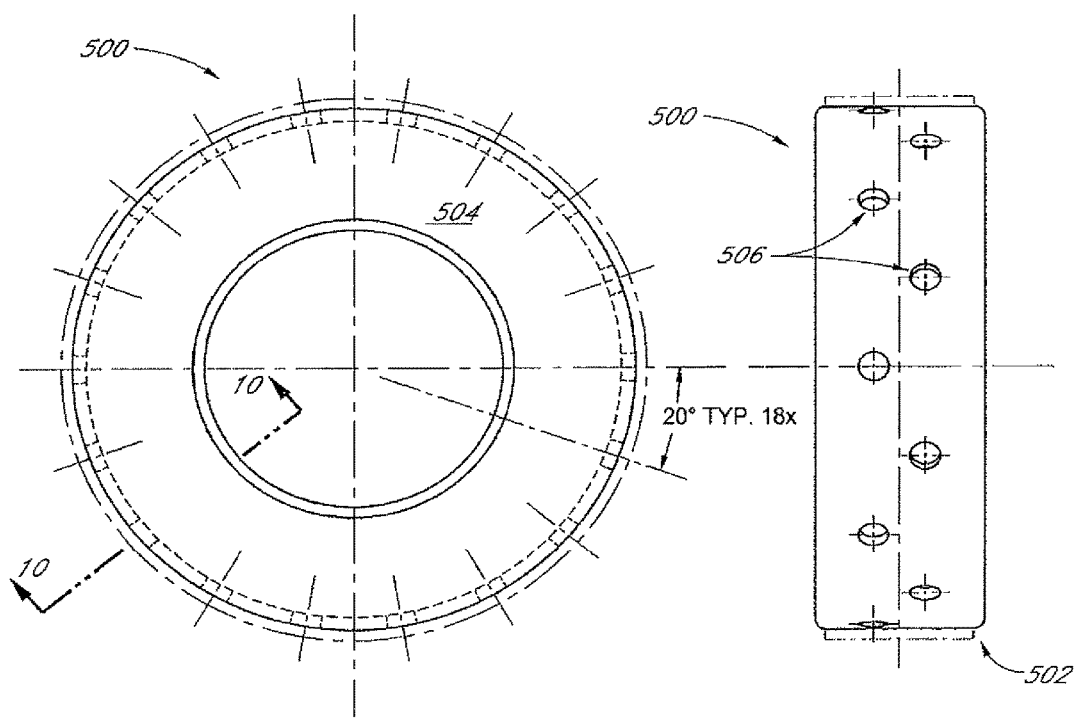
FIG. 9 is a front elevational view of a tire having been modified with a plurality of apertures configured to receive actuators and which extend along two offset circumferential paths along the outer surface of the tire.
FIG. 11 is a side elevational view of the tire of FIG. 9.

With reference to FIGS. 9-11, a tire 500 is illustrated therein as including a tread surface 502, a sidewall 504, and a plurality of apertures 506 for accommodating bolt assemblies 150, 152. The apertures 506, in some embodiments, extend through steel belts, commonly used on tires, and vulcanized rubber used on tires. Additionally, the apertures 506 extend through the tread pattern at the tread surface 502 of the tire 500 so as to provide a clearance for the moveable bolts 200 to retract and extend from the bolt assemblies 150, 152.

As shown in the schematic diagram of FIG. 9, apertures 506 can be spaced apart so as to be positioned at locations which result in continuous engagement of a bolt 200 with a road surface, meaning an ice or snow covered road surface, during operation, as the tire 500 rolls over the road surface 501 (FIG. 29), individual bolts 200 of the bolt assemblies 150, 152 (FIG. 28) will come into contact with the road surface 501, then be pulled away from the road surface 501 as a subsequent bolt 200 of another bolt assembly 150, 152 moves into contact with the road surface 501. In the illustrated embodiment, the tire 500 includes only eighteen apertures 506 for receiving bolt assemblies 150, 152. However, other numbers, greater or fewer, can also be used.

Optionally, the steel belt 602 within the tire 500 can be provided with apertures prior to being calendered with the rubber that also forms the outer and inner surfaces of the belt. For example, as shown in FIGS. 11A-11D, the steel belt 602 can be in the form of an axial single ply steel belt. The belt 602 can have thin steel discs or rings 603 welded to the belt at the desired locations of the apertures 506 (FIG. 11). For example, the discs or rings 603 can be welded to the belt 602 using precision-timed electric welds, for example at a plurality of weld spots 630 to provide an adequate connection between the wires of the belt 602 and the discs or rings 603. Subsequently, the discs or rings 603 can be punched with an aperture of the desired size for mounting the bolt assemblies 150, 152. Punching the discs or rings 603 also cuts the wires forming the underlying belts. Thus, the welded connection between the belts 602 and the ring-shaped portions of the discs or rings 603 remaining after punching, help compensate for the interruption of the wires caused by punching, thereby routing forces between the ends of interrupted wires of the belt 602. In some embodiments, the discs or rings 603 are about 1¾" in diameter and they are punched with a 1" diameter hole. After such reinforcement, the belt 602 can be calendered with rubber to form a component of the tire 500.

Figure 11G:
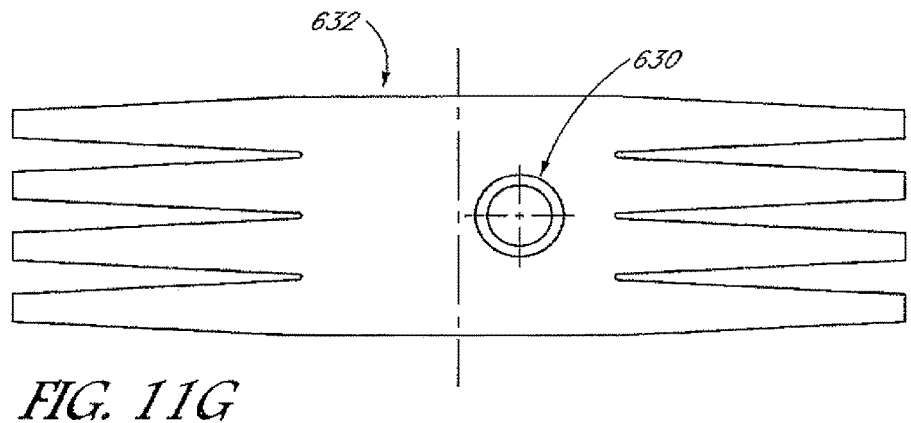
FIG. 11G is a plan view of a single section of the radial steel belt of FIGS. 11E and 11F.
Figures 11E, 11F:
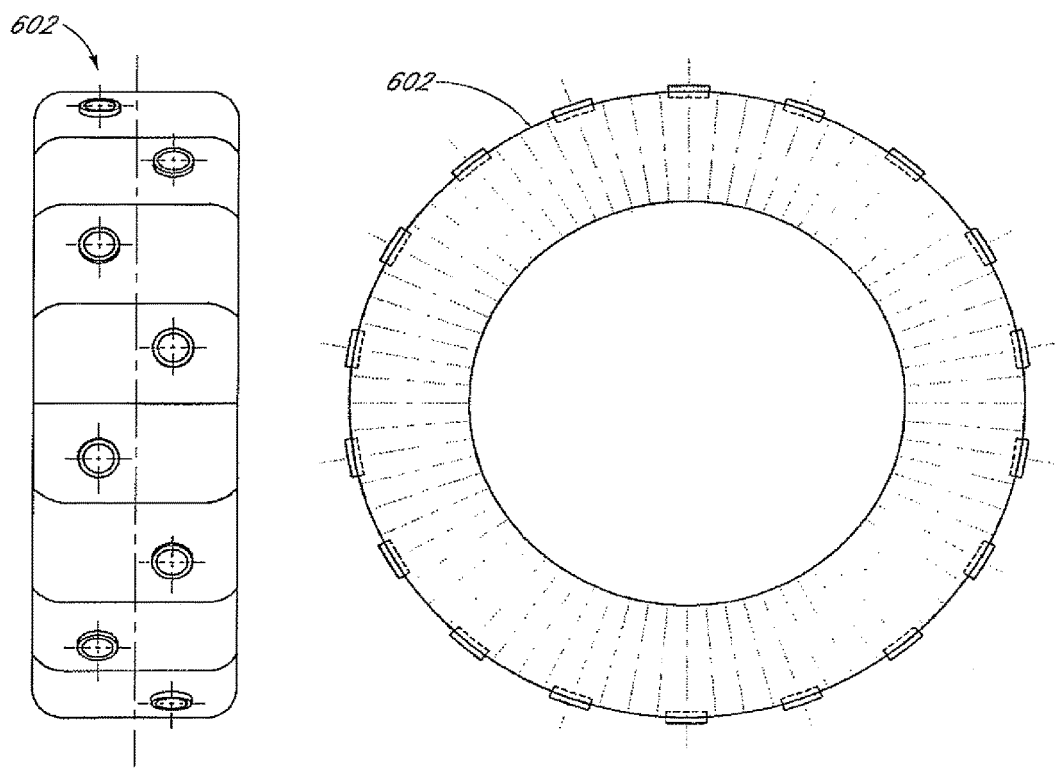
FIG. 11E is a front elevation view of an alternative configuration of the steel belt illustrated in FIGS. 11A-11D, having a radial steel belt configuration.
FIG. 11F is a side elevational view of the radial steel belt of FIG. 11E.

With reference to FIGS. 11E-11G, the belt 602 can also be in the form of a radial belt. FIG. 11G shows a punched disc 630 welded to a segment 632 of a radial belt configuration of the belt 602.

FIGS. 12-18 illustrate further modifications of the tire 500 that can be made to accommodate the bolt assemblies 150, 152, as well as the manifolds 194, 196, 198, 194B, 196B, 198B.

Figure 12:
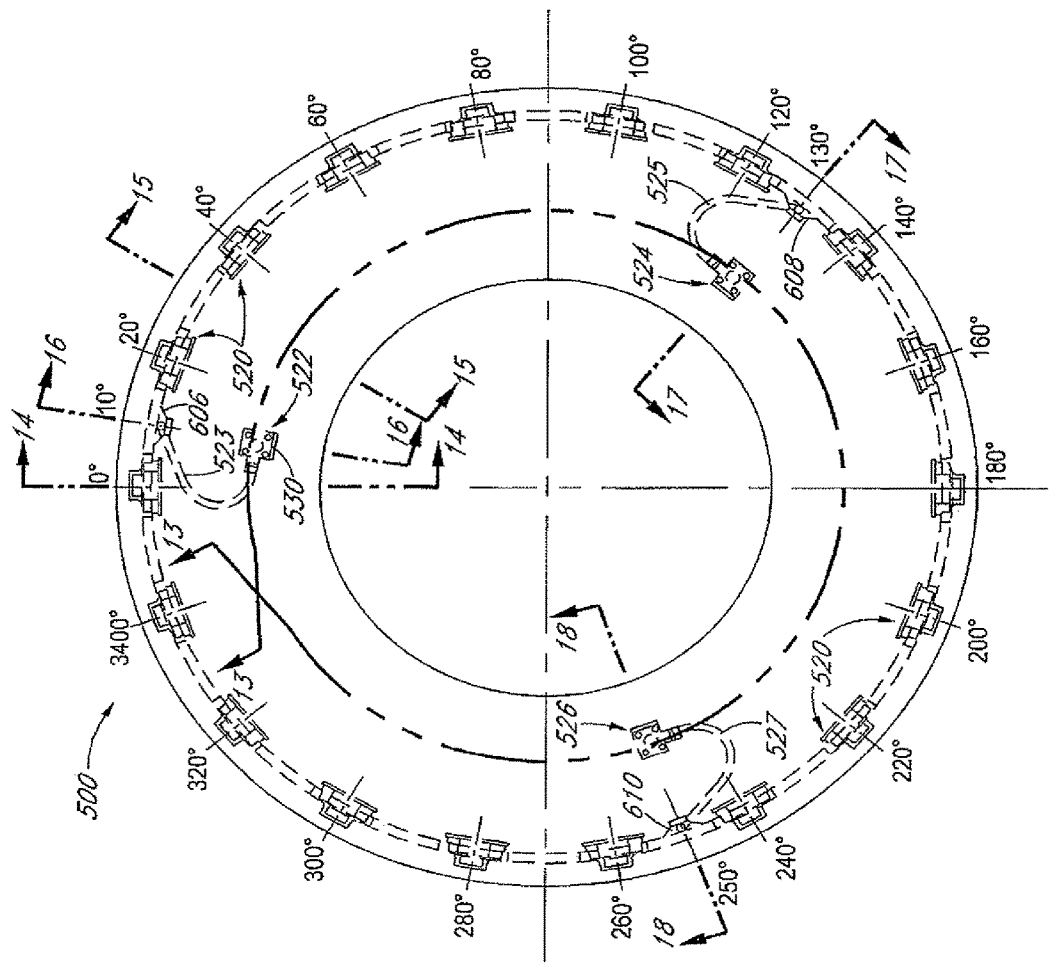
FIG. 12 is a front elevational view of the tire of FIG. 9 with base members of actuators depicted installed in the apertures illustrated in FIGS. 9 and 11.

FIG. 12 illustrates 18 installation sites 520 around the tire 500. Additionally, FIG. 12 illustrates three air distribution assemblies 522, 524, 526 for connecting the air interface 118 for control system 122 (FIG. 1) as well as the air supply subsystems 300, 300C to the various manifolds within the tire 500.

Figure 13:
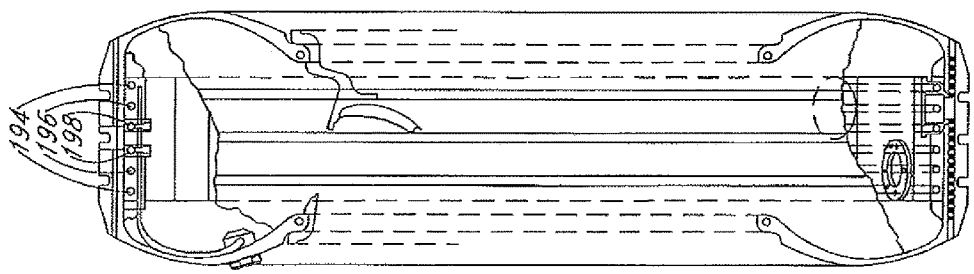
FIG. 13 is a side elevational and partial sectional view taken along line 13-13 of FIG. 12.

FIGS. 12 and 13 also illustrate an optional configuration of the manifolds 194, 196, 198, 194B, 196B, 198B within the tire 500. For purposes of simplicity, references to the various manifolds set forth below will only reference the manifolds 194, 196, 198 but it is understood that the statements apply equally to the manifolds 194B, 196B, 198B. There is a single tire 500 that may be utilized with: a manual wheel hub mounted control of bolts 200; an automated vehicle driver control in a configuration depicted in FIG. 3; or an automated vehicle driver control as depicted in FIG. 4.

As illustrated in FIGS. 11-18, the manifolds 194, 196, 198 extend around an inner surface of the tire 500 circumferentially around the tire forming a complete loop therein. However, other configurations can also be used.

Additionally, as is reflected in FIGS. 2A and 3A, each tire includes an inner set of manifolds 196, 194, 198, and an outer set of manifolds 194, 196, 198. The two sets of manifolds allows the installation sites 520 to be staggered along a path along the circumference of the tire 500, alternating between the inner and outer sets of manifolds. Otherwise, each of the installation sites for the bolt assemblies 150, 152, can be identical and are supplied with pressurized air by the two sets of manifolds in the same manner.

Further benefits can be achieved by dividing the air distribution points to each of the three manifolds with three different air distribution assemblies 522, 524, 526. This provides an inherent balance to the tire. For example, because there are three air distribution assemblies 522, 524, 526 they can be offset from each other by 120°. Additionally, each of the three distribution assemblies 522, 524, 526 can be configured to receive pressurized air from the air distribution subsystem 300, 300C, or the interface 118 (FIG. 1) and to split the air supply so as to provide air both to the inner and outer corresponding manifolds. For example, with reference to FIGS. 12 and 16 the air distribution assembly 522 provides a connection to the inner and outer lock manifolds 198, thereby allowing pressurized air to be supplied to and vented from the manifolds 198.

Figure 17:
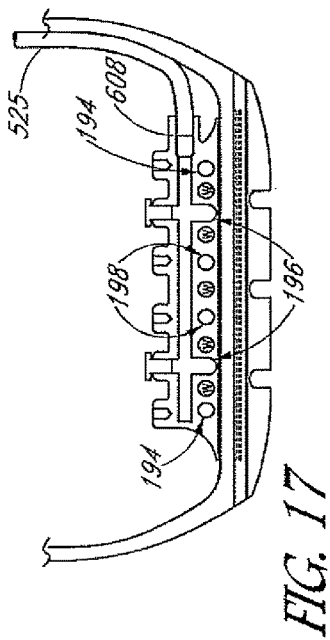
FIG. 17 is a cross sectional view of the tire of FIG. 12 taken along line 17-17.
Figure 18:
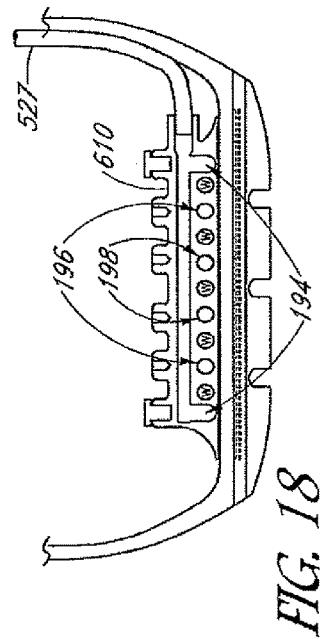
FIG. 18 is a cross sectional view of the tire of FIG. 12 taken along line 18-18.
Figure 15:
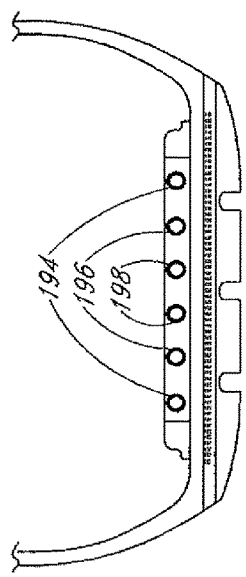
FIG. 15 is a sectional view of the tire in FIG. 12 taken along line 15-15.
Figure 14:
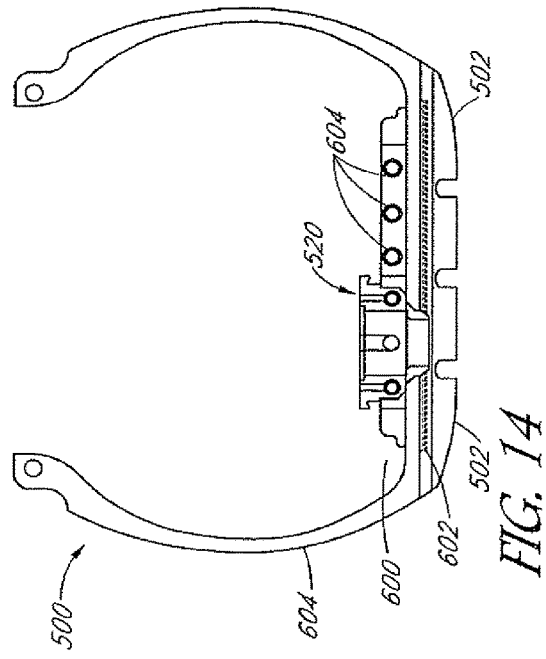
FIG. 14 is a sectional view of the tire in FIG. 12 taken along line 14-14.

FIGS. 12 and 17 illustrate how the air distribution assembly 524 is connected to inner and outer retract manifolds 196. Finally, FIGS. 12 and 18 illustrate how the distribution assembly 526 is connected to the inner and outer extend manifolds 194. Other arrangements of the manifolds can also be used.

Figure 16:
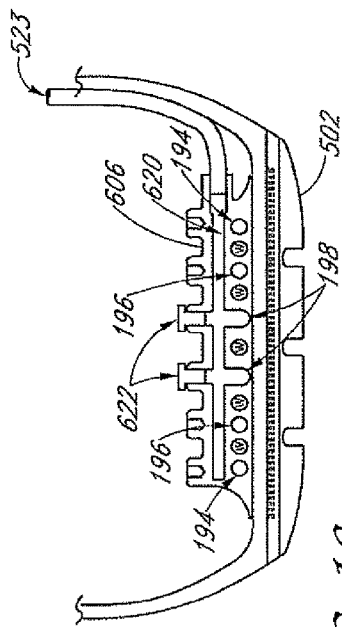
FIG. 16 is a cross sectional view of the tire of FIG. 12 taken along line 16-16.

With continued reference to FIGS. 12 and 16, in the illustrated embodiment, the air distribution assembly 522 includes an air supply line 523 that extends downwardly from an output of air distribution coupler 530. The coupler 530 can be secured to the side wall of the tire 500 in a through hole of the side wall of the tire 500. This provides for secure fixation of the coupler 530 and for support of the supply line 523 within the tire. It may also be molded into the tire side wall with no opening in side wall of tire. For example, during rotation of the tire 500, centrifugal acceleration causes forces on the supply line and coupler 530. The fixation of the coupler 530 to the side wall of the tire 500 also provides for accommodation of bends in the supply lines 523, 525, and 527 about an axis parallel to the rotational axis of the wheel 104 as well as bends in supply lines 523, 525, and 527. These bends allow the hoses or tubes to flex as the wheel rotates which causes the tire tread surface and the bolt assemblies 150, 152 to deflect toward the hub of the wheel 104 and as the wheel may also deflect when cornering. Other configurations can also be used.

As shown in FIGS. 12-18, the manifolds 194, 196, 198 can be formed along the inner circumferential surface of the tire 500 on the opposite side of the outer tread surface 502. For example, the tire 500 can include a rubber portion 600 disposed on the inner side of the steel belt 602. In some embodiments, the rubber portion 600 can be formed monolithically with the remaining portions of rubber forming the side walls 604, steel belt layer 602, and outer tread 502. In other embodiments, the portion 600 can be made from one or more separate pieces of material adhered to the inner circumferential surface of the tire 500. In some embodiments, the portion 600 is also made from molded rubber and bonded to the inner circumferential surface of the tire. Other configurations can also be used.

Further, in some embodiments, the manifolds 194, 196, 198 can be further defined by tube members 604 extending along the inside of the manifolds 194, 196, 198. In some embodiments, the tube members 604 are all made from flexible rubber or plastic material. Other materials and configurations can also be used.

Optionally, the air distribution assemblies 522, 524, 526 can be connected to the appropriate corresponding manifolds 194, 196, 198 through the use of manifold connector members 606, 608, 610. The three connector members 606, 608, 610 can have generally the same configuration except for their corresponding connections to different manifolds. Specifically, connector member 606 is configured to connect the supply line 523 to manifolds 198. The connector member 608 is configured to connect the supply line 525 with the manifolds 196. Finally, connector member 610 is configured to connect the air supply line 527 with the manifolds 194.

With continued reference to FIG. 16, the connector member 606 includes a transverse cross passage 620 that connects with the supply line 523. The cross passage 620 extends transversely across the top (as viewed in FIG. 16) of the manifolds 194, 196, 198. More specifically, the passage 620 is spaced above the manifolds 194, 196, 198 and is separated therefrom by a thickness of the connector member 606. Additionally, the connector member 606 includes a cylindrical section 622 aligned over the projected overlap between the passage 620 and manifolds such as manifolds 198. The cylindrical section 622 can facilitate a connection procedure between the cross passage 620 and any manifold. For example, in the orientation illustrated in FIG. 16, a drill can be passed into the cylindrical section 622, through the cross passage 620, and into the manifold 198. Then, a separate fastener or plug can be inserted into such drilled cylindrical section 622, thereby creating a closed, fluidic connection between the cross passage 620 and the manifold 198. Sealed as such, the supply line 523 can supply pressurized air to the manifold 198 but remain isolated from the other manifolds 194, 196. However, other configurations can also be used.

As shown in FIGS. 17 and 18, connection member 608 and 610 include similar features for providing isolated connections between the supply lines 525, 527 and the manifolds 196, 194, respectively.

Figure 19:
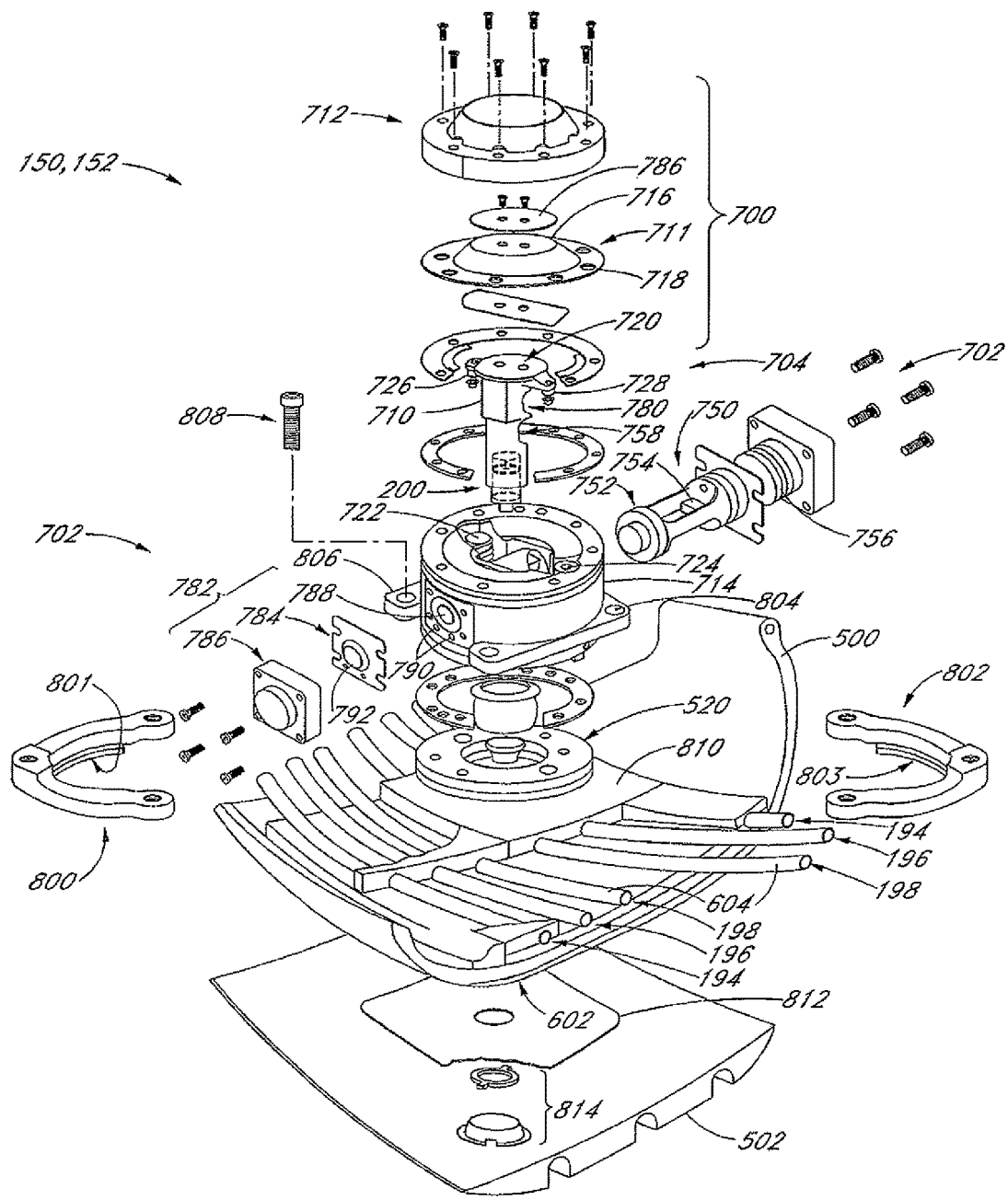
FIG. 19 is an exploded and partial cutaway view of a bolt assembly and tire including the unlocking, retraction, and extension air supply lines.
Figure 20:
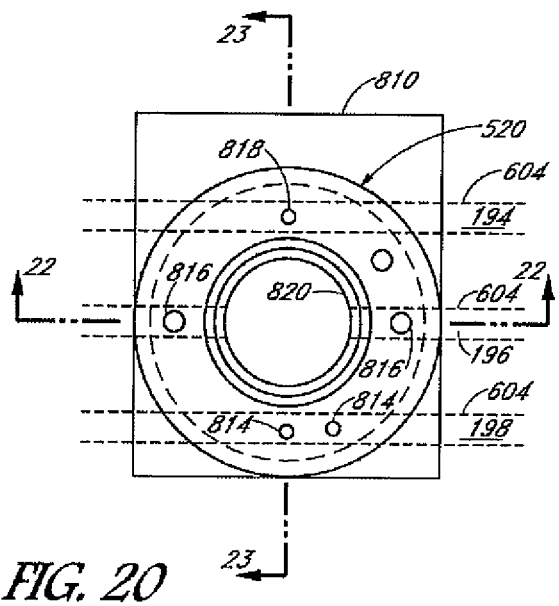
FIG. 20 is a top plan view of a base member assembly of the bolt assembly of FIG. 19 and illustrating connections to three air supply manifolds.
Figure 25:
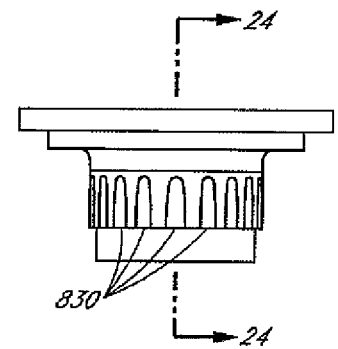
FIG. 25 is a front view of the base member removed from the base member assembly of FIG. 20.
Figure 21:
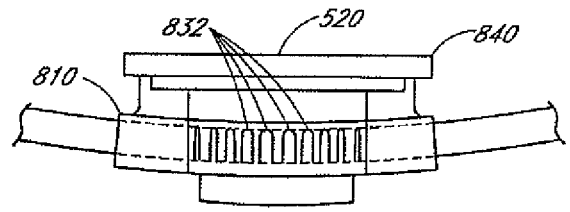
FIG. 21 is a side view of the base member assembly illustrated in FIG. 20.
Figure 24:
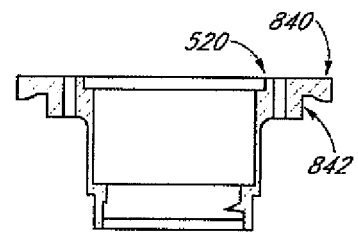
FIG. 24 is a sectional view of the base member of FIG. 20 taken along line 24-24 of FIG. 25.
Figure 22:
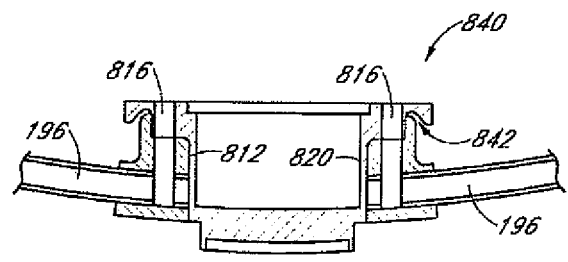
FIG. 22 is a sectional view of the base member illustrated in FIG. 20, taken a long line 22-22.

FIG. 19 illustrates an exploded view of a bolt assembly design which can be utilized for the bolt assemblies 150, 152. Other configurations can also be used.

In the illustrated embodiment, the bolt assemblies 150, 152 can include an extension actuator 700, a lock actuator 702 and a retraction actuator 704. The moveable bolt 200 is mounted in a bolt carrier 710. In some embodiments, to provide for adjustability of the magnitude at which the moveable bolt 200 extends outwardly from the outer tread surface 502 of the tire 500, the moveable bolt 200 can be threadedly engaged with the bolt carrier 710. Thus, rotational movement of the moveable bolt 200 relative to the bolt carrier 710 allows the moveable bolt 200 to change its axial position relative to the bolt carrier 710, described in greater detail below.

The extension actuator 700 can include a flexible diaphragm member 711 fixed between a cap member 712 and an upper portion of the main body 714 of the bolt assemblies 150, 152. The diaphragm member 711 can be made from any material typically used with diaphragm actuators. A central portion 716 of the diaphragm member 711 is vertically deflectable (as viewed in FIG. 19) relative to the cap member 712, the body portion 714, as well as the outer periphery 718 of the diaphragm member 711. The central portion 716 of the diaphragm member can be fixed to the upper end 720 of the bolt carrier 710.

The main body 714 can also include two springs 722, 724 aligned with lateral projections 726, 728 of the bolt carrier 710. Additionally, the bolt carrier 710 is configured to be slideably moveable within the main body 714. The springs 722, 724 can be configured and sized to bias the bolt carrier 710 into a retracted position, i.e., an upper-most position within the main body 714. One or more passages within the main body 714 can connect the extend and retract manifolds 194, 196 to opposing sides (i.e. above and below) of the diaphragm member 711. More specifically, as noted above, the extend manifold 194 is provided with pressurized air when it is desired to cause the bolts 200 to extend outwardly from the tire. Thus, internal passages through the base member 520 and the main body 714 can be provided for connecting the extend manifold 194 to the upper side (as viewed in FIG. 19) of the diaphragm member 711. As such, when pressurized air is provided into the space between the upper surface of the diaphragm member 711 and the cap 712, the central portion 716 of the diaphragm member 711 is pushed downwardly away from the cap 712, thereby pressing on the upper portion 720 of the bolt carrier 710, thereby pushing the moveable bolt 200 downwardly into the extended position, against the bias of the springs 722, 724. Similarly, other internal passages can connect the retract manifold 196 with an area within the bolt assembly 150, 152 below the diaphragm member 711 (as viewed in FIG. 19). Thus, when compressed air from the retraction manifold 196 is applied to the area beneath the diaphragm member 711, the portion of the diaphragm member 711 surrounding the central portion 716 is pushed upwardly toward the cap 712, thereby augmenting springs 722, 724 pulling the upper portion 720 of the bolt carrier 710 upwardly into the retracted position thereby moving the bolt 200 upwardly as well.

The lock actuator 702 can include a moveable lock member 750 including a piston end 752 and a locking projection 754. The lock actuator 702 can also include a spring 756 configured to bias the lock member 750 toward a locked position, described in greater detail below. In the locked position, the projection 754 can engage one of two recesses 758, 780 so as to lock the bolts 200 in an extended position (when projection 754 engages recess 780) or a retracted position (when projection 754 engages recess 758).

The lock actuator 702 can also include a diaphragm assembly 782. The diaphragm assembly 782 includes diaphragm member 784 and a cap member 786. A locking actuator passage 788 disposed in the main body 714 provides for communication and a reciprocal sliding motion of the lock member 750 relative to the main body 714. Air passages 790 in the main body 714 allow for actuation air from the unlock manifold 198 to be guided to a space between the diaphragm member 784 and the cap 786. When air is guided as such, a central portion 792 of the diaphragm member 784 is pushed away from the cap member 786 toward the piston head 752 of the lock member 750. Thus, such pressurized air causes the lock member 750 to slide laterally away from the cap 786 thereby moving the projection 754 away from either recess 758 or 780. With lock member 750 in that position, the bolt carrier 710 is unlocked and can reciprocate within the main body 714. The bias of the spring 722, 724, would normally bias the bolt carrier 710 towards a retracted position. However, centrifugal acceleration generated during operation and rolling movement of the tire 500 can cause sufficient force on the bolt carrier 710 to overcome the bias of the spring 722, 724, thereby allowing the bolt 200 to extend outwardly. In some embodiments, the lock member 750 is configured to move along a direction parallel to the wheel axle of the tire 500. As such, the movement of the lock member 500 is isolated from the centrifugal accelerations generated during rotation of the tire 500 during operation of an associated vehicle. This configuration can help prevent movement of the lock member 750 caused by rotation of the tire 500 during operation. Other configurations can also be used.

The spring 756, on the other hand, in the absence of air pressure between the diaphragm member 784 and the cap 786, is sufficient to cause the lock member 750 to remain in a locked position, in a position in which the projection 754 engages one of the recesses 758, 780.

The bolt assemblies 150, 152 can also include various brackets 800, 802 and flanges 804, 806 for securing the main body 714 to the tire 500. In some embodiments, the brackets 800, 802 cooperate with the flanges 804, 806 and threaded fasteners 808 to secure the bolt assembly 150, 152 to a mounting block member 810 which provides for communication between the manifolds 194, 196, 198 and various passages on the base member 520 (described in greater detail below with reference to FIGS. 20-24). The brackets 800, 802 can be identical to each other. Additionally, a reinforcing member 812 can be disposed between a steel belt layer and the outer tread layer 502 for enhancing the securement of the bolt assembly 150, 152 to the tire 500. The reinforcing member can be made from multiple thin sheets of KEVLAR®. In some embodiments, four layers of KEVLAR® can be used, for example, oriented so that their fibers extend in different directions. Other materials can also be used. Additionally, additional rings and retainers 814 can be used to further secure the bolt assemblies 150, 152 to the tire 500.

FIGS. 20-24 illustrate, in greater detail, the base member 520 and the connection block 810, which together can form a base member assembly. The connection block 810, as illustrated in FIG. 19, is designed to fit around the flexible tubes 604 which partially define the manifolds 194, 196, 198. The tubes 604 can extend partially into or completely through the block 810 to which the tubes are affixed and sealed for secure airtight engagement. Additionally, the block 810 includes internal circular recess 812 into which the base member 520 can fit. The base member 520 also includes internal passages 814, 816 and 818 for communication with the manifolds 194, 196, 198. The connection block 810 may be molded rubber.

Figure 23:
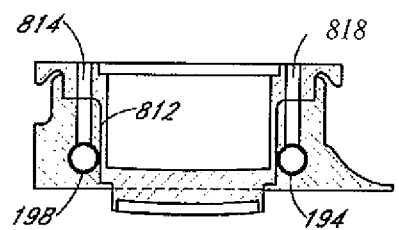
FIG. 23 is a sectional view of the base member illustrated in FIG. 20, taken along line 23-23.

The base member 520 also includes a central passage 820 into which the lower portion of the main body 714 of the bolt assemblies 150, 152 engages the base member 520 for facilitating communication of compressed air in and out of the bolt assemblies 150, 152. As shown in FIG. 23, air passages 814 provide communication between the manifold 198 and the lock actuator 702. Similarly, the body 520 includes passages 816 for providing communication between the manifold 196 and the retraction actuator 704. Further, similarly, the base member 520 includes passages 818 for providing communication of compressed air in and out of the extension actuator 700 for extending the bolts 200.

Optionally, the base member 520 can include anti-rotation features for preventing rotation of the base member 520 relative to the tire 500. For example, the base member 520 can include external splines or serrations 830 engaged with corresponding internal splines or serrations 832 on the block member 810. With the serrations engaged as such, the block member 810 and the base member 520 can be securely rotationally coupled. Thus, with the block member 810 bonded or otherwise fixed to the inner surface of the tire 500, the base member 520 is rigidly fixed in place and will resist torques that may be applied, for example, when bolts 200 are turned within the bolt receivers 710.

Additionally, the base member 520 can include a peripheral lip 840 with an undercut 842 which can be configured to provide enhanced engagement with connectors used to connect the remainder of the bolt assembly 150,152 to the base member.

For example, with reference to FIG. 19, the bolt assemblies 150, 152 can include brackets 800, 802 which include ramped inner lips 801, 803 configured to engage the undercut 842 on the base member 520. More specifically, the ramped inner lips 801, 803 can have a shape that is complementary to the undercut 842 to thereby provide a more secure attachment between the main body 714 and the base member 520.

Figure 26:
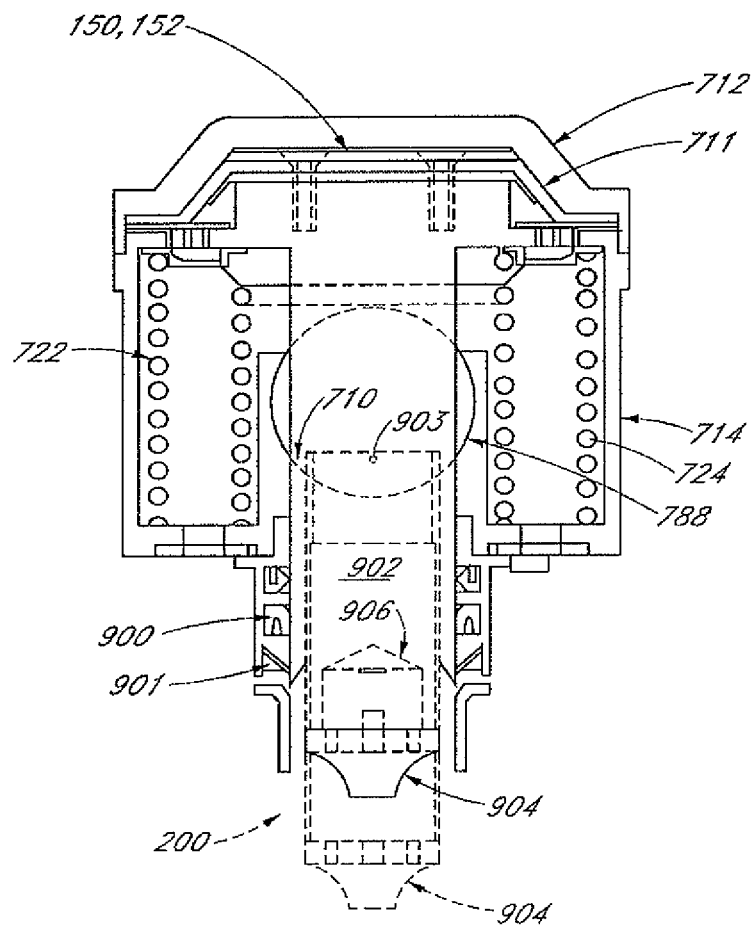
FIG. 26 is a schematic sectional view of a portion of the bolt assembly of FIG. 19 in an assembled state and illustrating a retracted position of the bolt (solid line) and an extended position of the bolt (phantom line). The sectional view of the bolt is perpendicular to the wheel axle.
Figure 27:
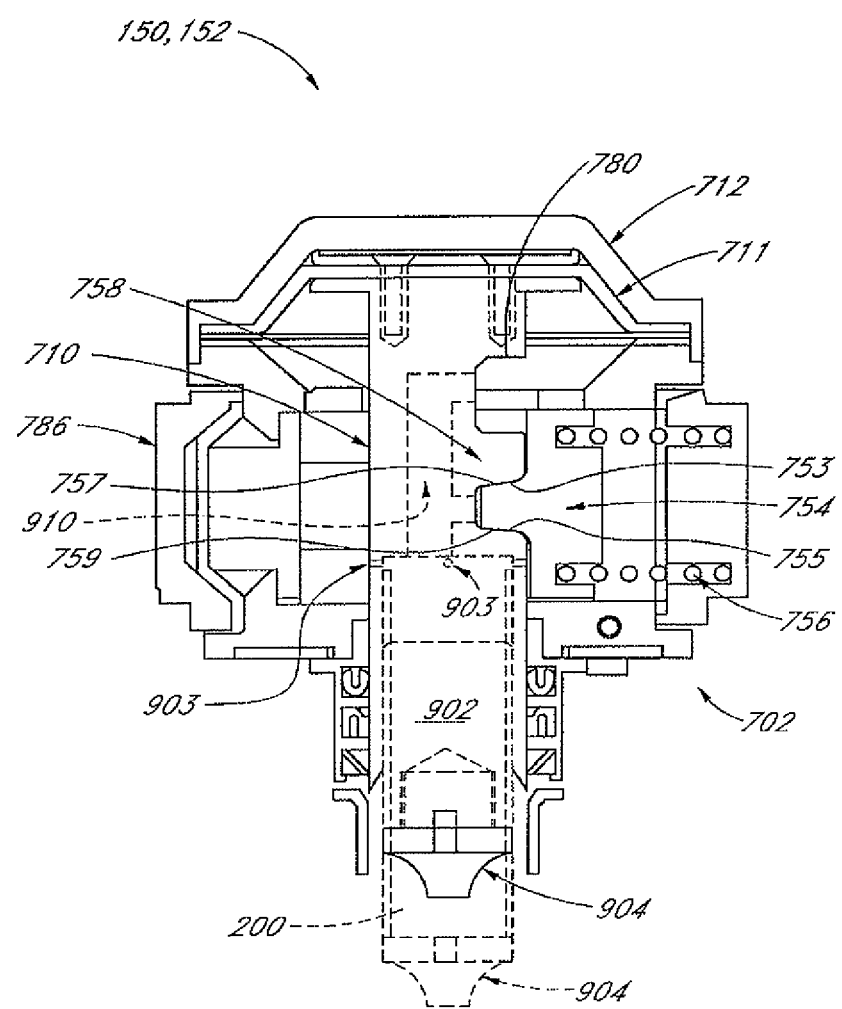
FIG. 27 is another schematic sectional view of the portion of the bolt assembly of FIG. 19 illustrating a locked position of the locking member with the bolt in a retracted position (solid line). The axis of the locking member is parallel to the wheel axle.

FIGS. 26 and 27 further illustrate the components of the bolt assemblies 150, 152 shown in FIG. 19. With reference to FIGS. 26 and 27, the bolt assemblies 150, 152 can also include a seal assembly 900 which can include a plurality of gland seals and gaskets for providing a sliding airtight seal between the main body 714 of the bolt assemblies 150, 152 and the moveable portions of the bolt itself, which includes the moveable bolt 200 and the bolt carrier 710. Thus, as the bolt carrier 710 moves upward and downwardly (as viewed in FIG. 26), the gland seal assembly 900 maintains an airtight seal. Optionally, the gland assembly can include an ice wiper device 901 so as to scrape off ice that may accumulate on the outer surface of the bolt 200 as the bolt 200 is retracted, thus protecting the glands disposed within the gland seal assembly 900. Additionally, as noted above, the moveable bolts 200 can include a bolt body 902, and a replaceable tip portion 904. The bolt body 902 can include external threads and the inner surface of the bolt carrier 710 can include internal threads so that the bolt body 902 can be axially adjusted relative to the bolt carrier 710. Additionally, the bolt body 902 can further include a lower recess 906 with internal threads which cooperate with external threads on the removable tip portion 904. As such, the removable tip portion 904 can be conveniently removed and replaced. As such, maintenance of such an adaptive tire system can be reduced by providing for inexpensive replacement tips 904.

Additionally, the bolt assemblies 150, 152 can include one or more passages 903 configured to aid in maintenance and are particularly useful in adding lubrication. For example, the bolt carrier 710 can include one or more apertures 903 connecting the inner recess having internal threads for receiving the external threads of the bolt 200 to the outer surface of the bolt carrier 710. Thus, if the bolt is unscrewed or otherwise removed from the bolt carrier 710, lubricants can be disposed in the recess or on an upper end of the bolt 200 and thereafter the bolt 200 can be threaded into the recess. As such, lubricant can be pressed through the aperture 903 and into the space within the main body 714 and onto the outer surface of the bolt carrier 710, which can thereby assist in lubricating the glands in the gland assembly 900, as well as other services within the main body 714. This can be particularly beneficial because such removal and addition of lubrication can be performed from the exterior of the wheel 500. In other words, it is not necessary to remove the tire 500 from its associated rim in order to remove the bolts 200 or add lubricant to the inside of the bolt assembly 150, 152.

Further benefits can be achieved by providing the additional internal passage 910 extending upwardly from the bolt receiving recess and opening into the ends of the recesses 758, 780 of the bolt carrier 710. For example, if the bolt carrier 710 or the lock actuator 702 becomes stuck, the bolt 200 can be removed from the bolt carrier 710 and a tool can be inserted into the passage 910 and into contact with a tip of the projection 754 so as to dislodge the lock member 750. Thus, such a feature enhances the serviceability of the bolt assemblies 150, 152.

With continued reference to FIG. 27, the recess 758 and the projection 754 can include complementarily sloped faces to aid in smooth operation and prevent excessive friction. For example, the recess 758 can include opposing lateral faces 757, 759 which are sized and shaped to cooperate with faces 753, 755 of the projection 754. The faces 757, 759 are sloped such that the faces 757, 759 are splayed away from each other such that the recess 758 is slightly trough shaped. Similarly, the faces 753, 755 of the projection 754 are sloped such that the projection 754 is slightly wedge-shaped. The faces 757, 759 and faces 753, 755 can be selected generally the same angle for example, but without limitation about 7°. Other angles can also be used. Such sloping of the faces 757, 759, 753, 755, as noted above, helps prevent excessive friction between the faces so as to better ensure smooth operation and movement of the lock member 750 between locked and unlocked positions.

Figure 28:
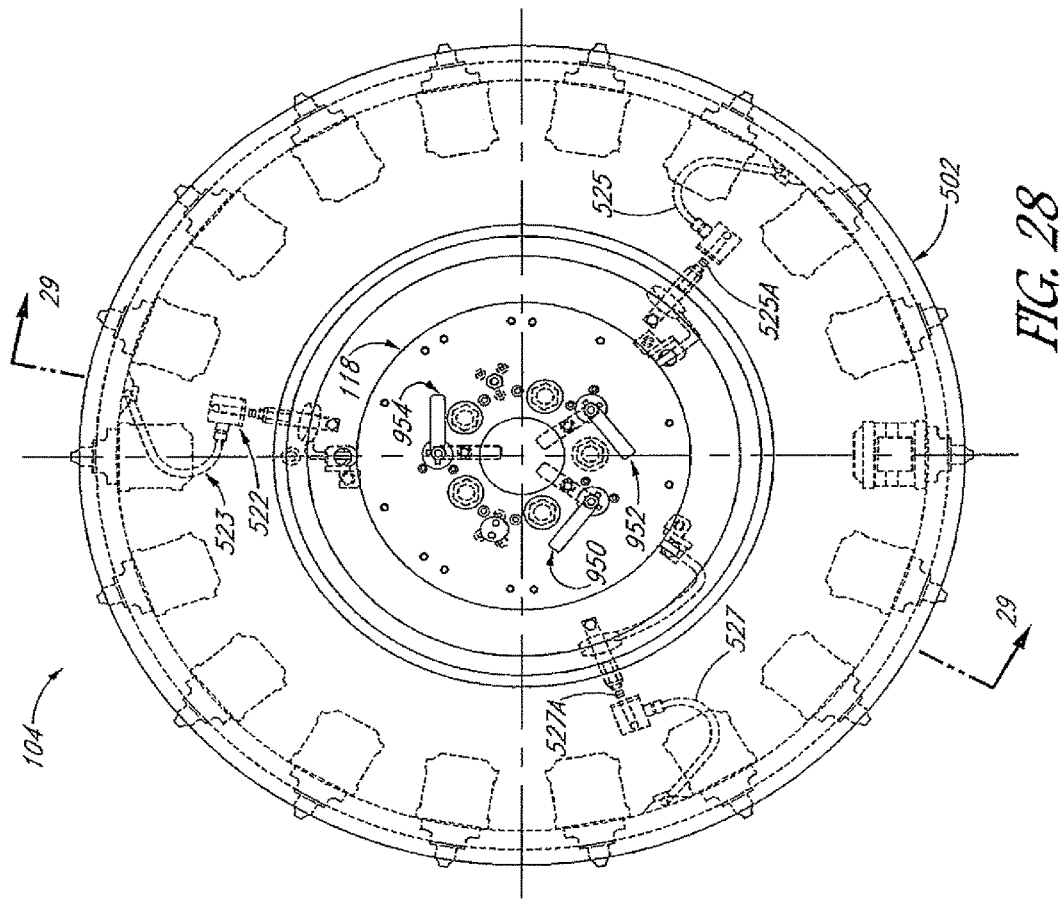
FIG. 28 is a front elevational view of a combined tire and wheel assembly including bolt assemblies shown in phantom and manually operated valves for controlling the supply of actuation air to actuators of the bolt assemblies for extension, retraction, and locking which can be incorporated into the systems of FIGS. 1 and 2 and 2A.
Figure 29:
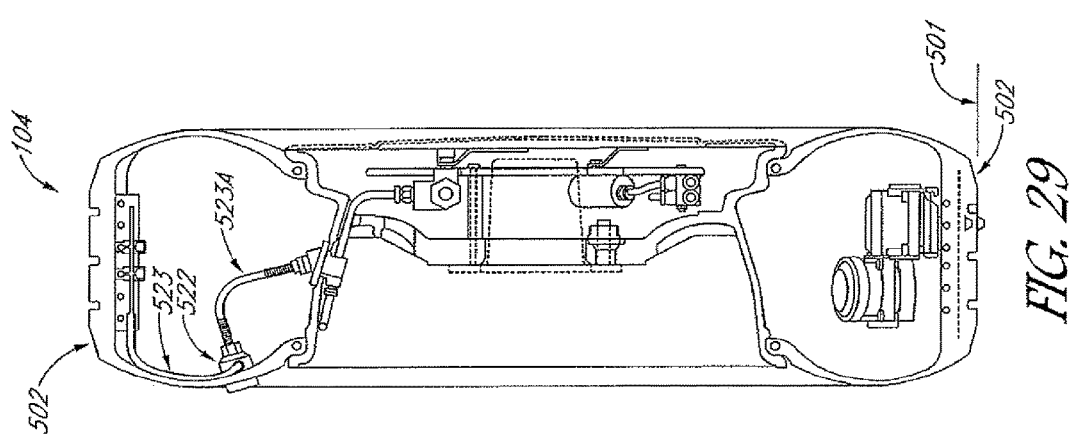
FIG. 29 is a sectional view of the tire illustrated in FIG. 28, taken along line 29-29.

FIGS. 28 and 29 illustrate a fully assembled adaptive wheel 104 (described in more general terms with reference to FIG. 1). The wheel 104 includes the manual interface 118 which incorporates manual valve lever 950 for operating the extend valve 178, lever 952 for operating the retract valve 180 (FIG. 2A) and lever 954 for operating the unlock valve 182 (FIG. 2A).

With continued reference to FIGS. 2A, 11, 12, 28 and 29, the levers 950, 952, 954 can be used to control the flow of compressed air in and out of the bolt assemblies 150, 152. As noted above with regard to FIG. 12, certain components such as the supply lines 523, 525, 527 are secured in place partially by the couplers 530.

Figure 31:
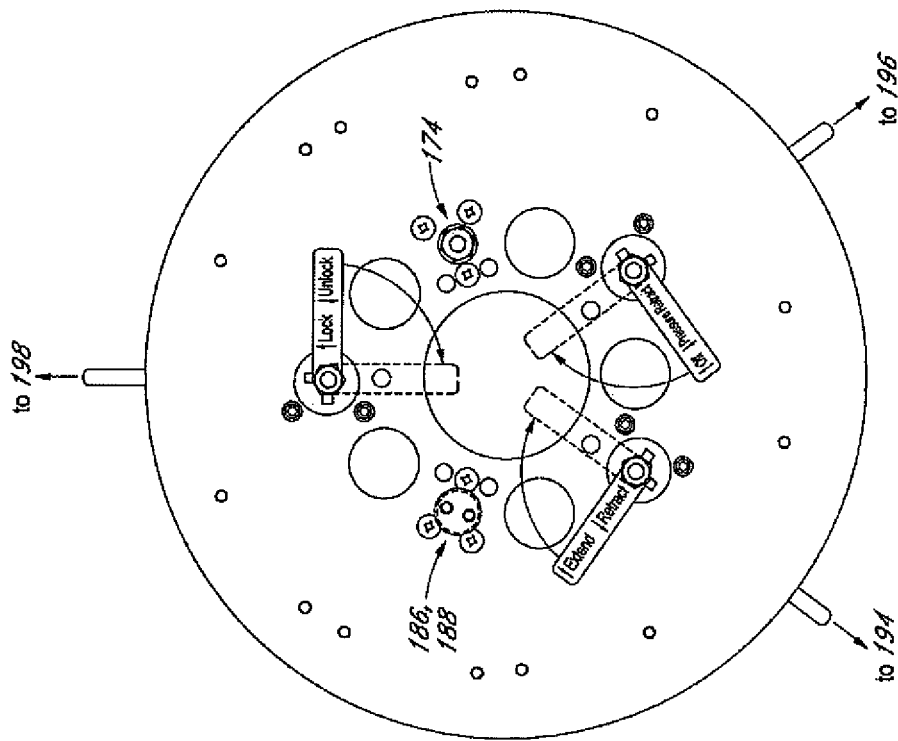
FIG. 31 is a front elevational view of a control unit at the hub of the wheel of FIG. 30 showing the levers for manually operating the valves illustrated in FIG. 30.
Figure 30:
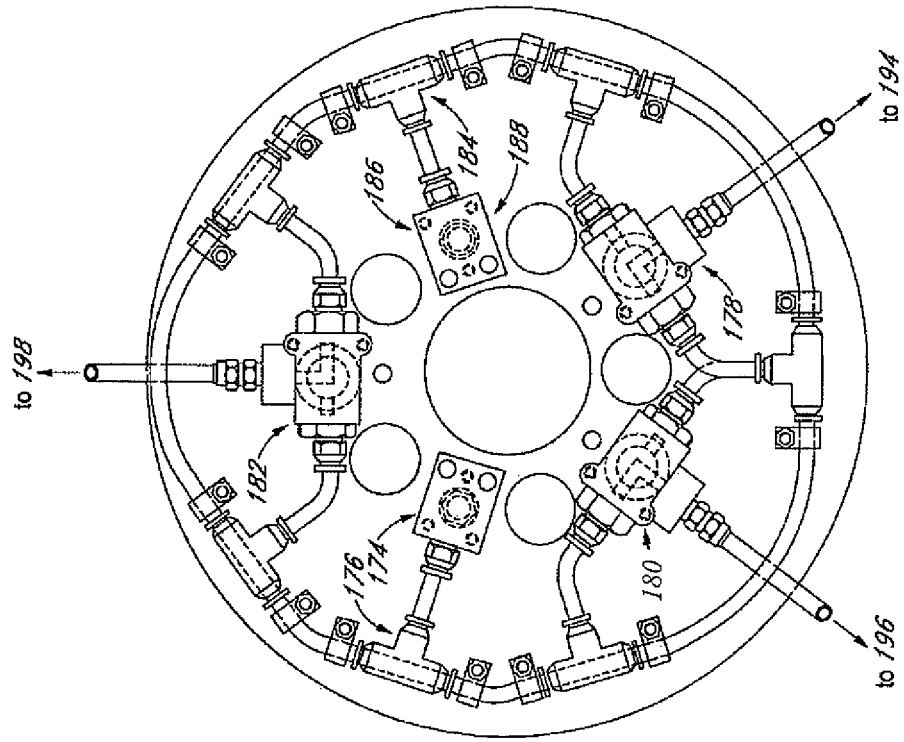
FIG. 30 is a rear elevational view of a control unit at a hub of the wheel of FIG. 29 illustrating valve bodies and various connections of the air supply system.
Figures 37, 38, 39:
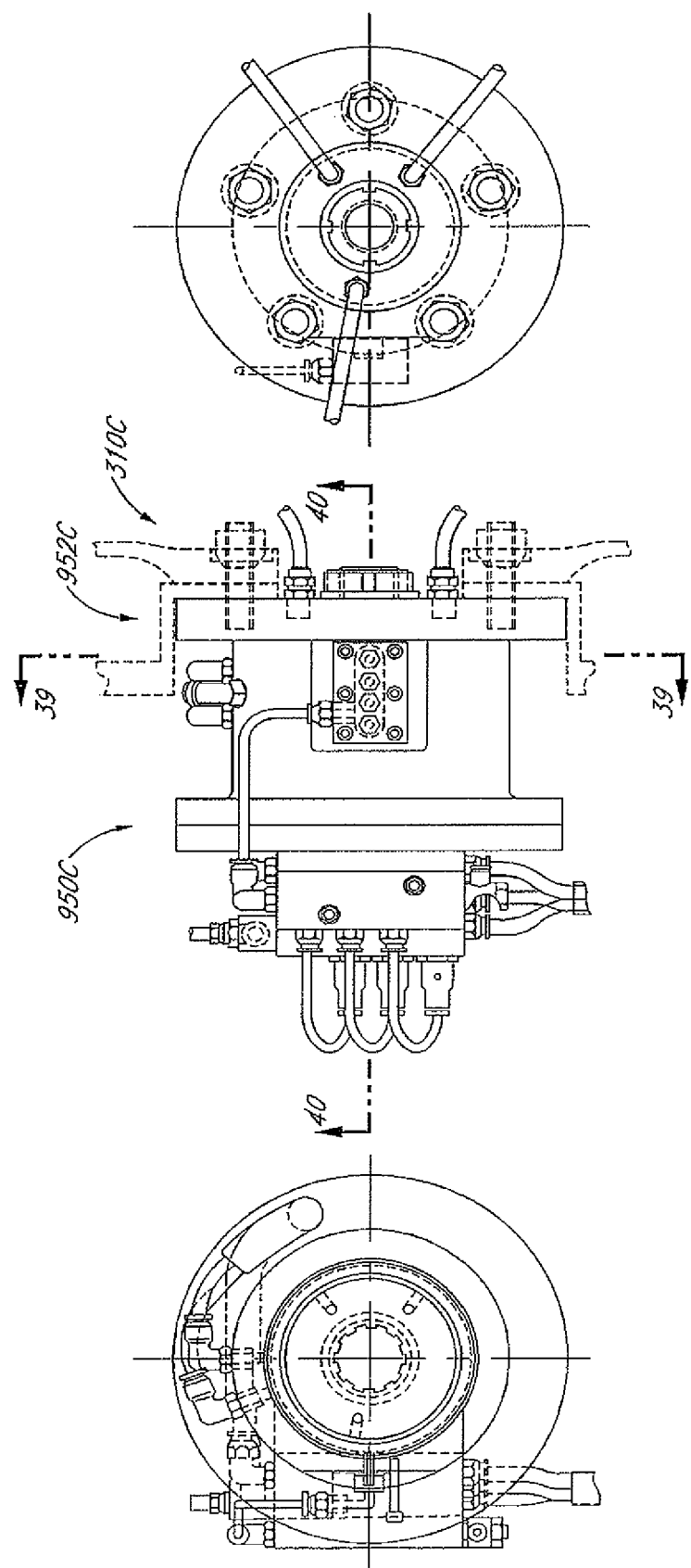
FIG. 37 is a top plan view of an internal rotary union unit that can be used with the system of FIGS. 4 and 3B.
FIG. 38 is an end view of the internal rotary union of FIG. 37.
FIG. 39 is a partial sectional view of the internal rotary union of FIG. 37, taken along line 39-39.

FIGS. 30 and 31 show a more detailed view of the valves 178, 180, 182 and their connections to the high-pressure reservoir 176, which is in the form of a loop and the vent reservoir 184 which is also in the form of a loop. Each of the loops 176, 184 can be formed with a plurality of tubes and connectors, as is within the skill of one of ordinary skill in the art.

FIGS. 32-34 illustrate more detailed views of the flexible tube bundles 304 initially described above with reference to the external rotary unions 310 of FIG. 3. As shown in FIG. 32, the rotary unions 310 can include a rotary union input assembly 950 and a rotary union output assembly 952. The rotary union input assembly 950 is connected to three pneumatic lines within the bundle 304. The rotary union output assembly 952 includes three internal channels for communicating the pneumatic lines within the bundles 304 to manifolds within wheel 104B.

The output assembly 952 is fixed to the rim of the vehicle wheel 104B and is rotatable relative to the rotary union input assembly 950. The structure and operation of rotary unions is well known in the art. Thus, further detail about the internal construction of the rotary union 310 is not described in greater detail herein. However, one of ordinary skill in the art understands that the manifolds 194, 196, 198 are connected to the vehicle wheel 104B through three fluidic channels that extend from the rotary union input assembly 950 into the rotary union output assembly 952 and can operate whether the vehicle and thus the vehicle wheel 104B is moving or stationary.

FIGS. 35 and 36 illustrate more detailed views of the flexible bundles 304 used for the front steerable wheels, initially described above with reference to FIG. 3.

Finally, FIGS. 37-40 illustrate additional more-detailed views of the internal rotary union units 310C initially described above with reference to FIG. 4. Similarly to the rotary union unit 310, the rotary union unit 310C includes a rotary union input assembly 950C and a rotary union output assembly 952C. As with the above described rotary union unit 310, the rotary union unit 310C also connects the manifolds 194, 196, 198 with the various components within the vehicle wheel 104C through three fluidic channels extending from the rotary union output assembly 952C into the rotary union input assembly 950C.

Optionally, the rotary union units 300 or 300C can include retractable/expandable seals. For example, known rotary unions include seals that are in continuous contact with sliding or rotating surfaces within the union. In the illustrated environment of use, the rotary union units 300 and 300C while always rotating while vehicle is moving are used infrequently; only during bolt 200 extension and retraction operations. The rotary union units 300 and 300C are not used when the bolts 200 are held in either the retracted or extended positions. Thus, there is no need for the rotary union units 300, 300C to achieve the air seals that are necessary for their operation when no extension or retraction operations are being performed. By retracting the seals when the rotating union units 300 300C are not being used reduced the wear that would normally occur, thereby dramatically increasing the useful life of the seals.

The rotary union units 300 or 300C can include any type of actuators for expanding and retracting the seals. In some embodiments, the seals can be pneumatically or hydraulically operated. Additional benefits can be achieved where the seals are controlled by the same pressurized air used for operating the bolt assemblies 150, 152. Optionally, the units 300 300C can include a pressure intensifier device to expand the seals more rapidly when air pressure is applied to the seals.

As is well known in the art, rotary unions include seals sized to fit and seal the stator grooves to the rotary union rotor. The rotary union units 300, 300C can include an expandable seal unit configured to be selectively expandable.

Figure 41:
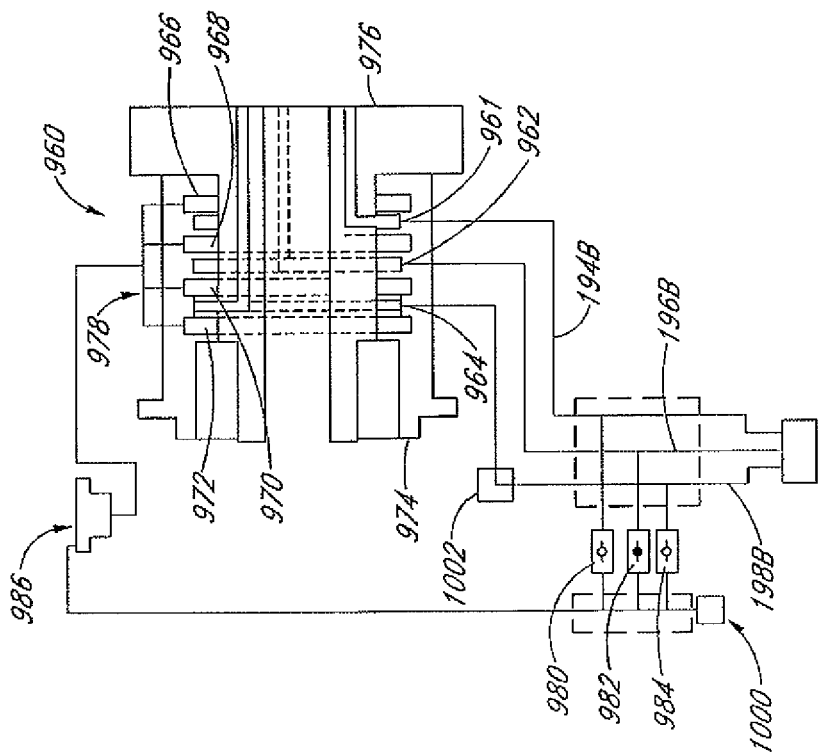
FIG. 41 is a schematic diagram of the rotary union of FIG. 37 for supplying three channels of actuation air to an adaptive tire.
Figure 40:
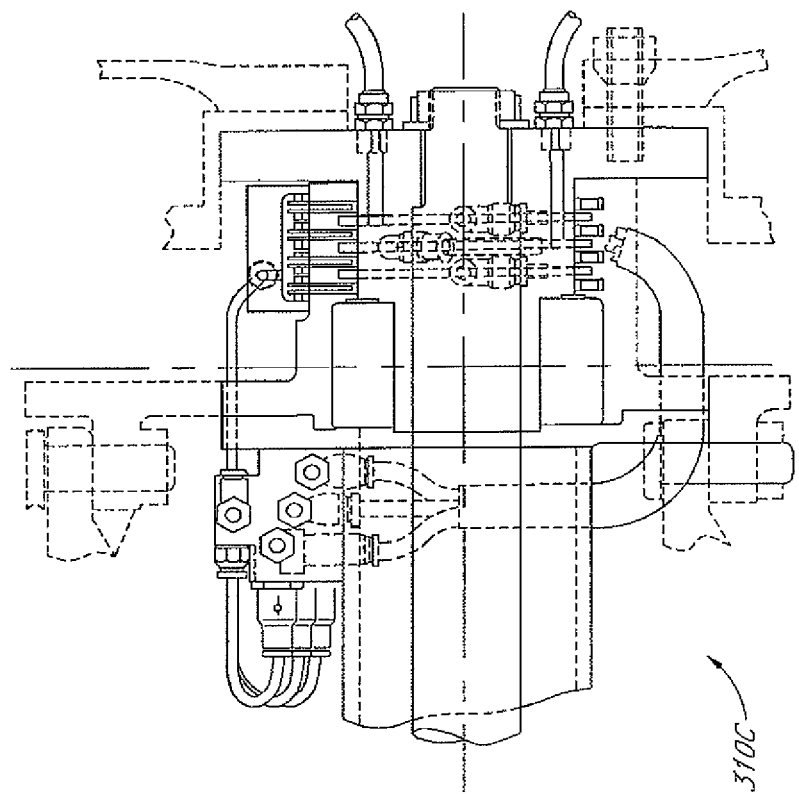
FIG. 40 is another sectional view of the internal rotary union of FIG. 37, taken along line 40-40.
Figure 42:
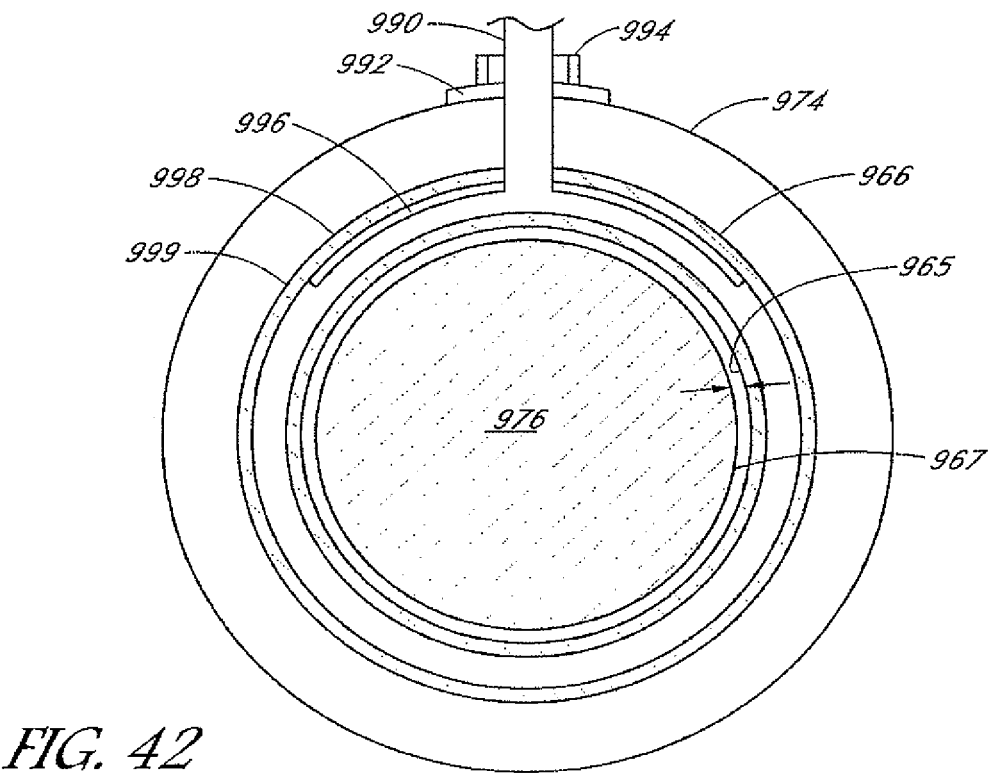
FIG. 42 is a schematic cross-sectional view of a seal that can be incorporated into the rotary unions illustrated in FIGS. 32-41, with the seal in a retracted state.
Figure 43:
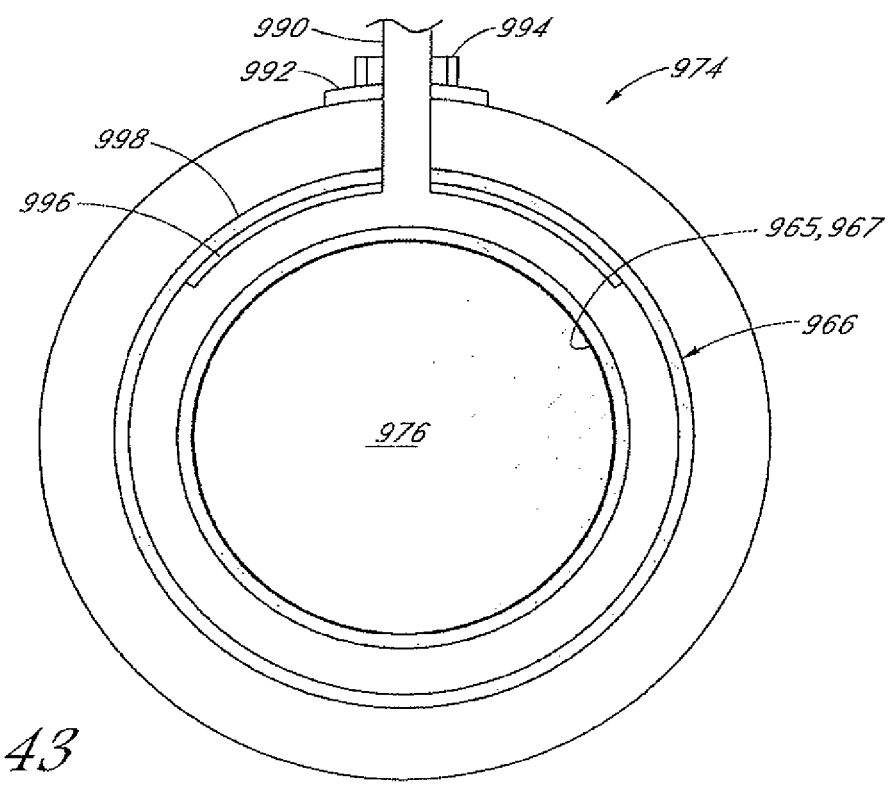
FIG. 43 is another schematic cross-sectional view of the seal of FIG. 42, with the seal in an extended state.

For example, with reference to FIGS. 41-43, the rotary union 300C includes three inputs for connections to the manifolds 194B, 196B and 198B which open into three circumferential stator grooves 961, 962, 964, respectively. Seals 966, 968, 970, and 972 surround each of the three grooves 961, 962, 964 and press against both the stator body 974 and the rotor 976 which rotates with the wheels of an associated vehicle. Seal 966 is illustrated in FIGS. 42 and 43, but it is to be understood that the illustrations and descriptions of seal 966 also apply to seals 968, 970, 972.

The seals 966, 968, 970, 972 can be configured to be expandable. For example, the seals 966, 968, 970, 972 can be in the form of hollow, internal cylindrical cross section donuts made of low friction inert plastic PTFE, sized to fit and seal the stator groove, and a few thousandths of an inch larger than the rotary union rotor diameter. Optionally, the seals 966, 968, 970, 972 can have a rectangular or square-shaped cross-section. Additionally, the seals 966, 968, 970, 972 can be configured to be inflatable such that the surface 965 at the inner diameter of the seal 966 decreases with inflation, at least enough to make a functional seal against the outer surface 967 of the rotary union rotor. Optionally, the seals 966, 968, 970, 972 can include a molded, threaded metal hollow stem 990 extending beyond the stator external surface when passed through an opening from the stator grooves sufficient for a gasket seal washer (not shown), metal washer 992, and nut 994. The seals 966, 968, 970, 972 can also include a metal blade spring 996, which can extend 60 degrees to either side of hollow metal threaded stem 990 to support the seals 966, 968, 970, 972 in the stator seal groove and to reduce contact with the rotor 976 when the seals 966, 968, 970, 972 are not pressurized. The blade spring 996 can be within the molded doughnut seal 966, which can have a square or rectangular cross-section. Additionally, the blade spring 996 can be biased so as to press the outer surface 998 of the seal 966 against the inner surface of the stator seal groove 999.

Optionally, the units 300, 300C can include a common seal manifold 978 which can be disposed at the stator body 974. The manifold can include an input side connected to the manifolds 194B, 196B, 198B with check valves 980, 982, 984, respectively. Thus, when any of the manifolds 194B, 196B, 198B are pressurized, then the seals 966, 968, 970, 972 are also pressurized and thereby inflated. The seals 966, 968, 970, 972 can be appropriately and timely inflated even if only the unlock and extend manifolds (198B, 194B) are connected to the seal manifold 978.

During operation, the seals 966, 968, 970, 972 can be initially pressurized by a flow of compressed air in the unlock manifold 198B. This manifold 198B should always be pressurized first since the bolts 200 should be unlocked first before movement is attempted. Pressure to the manifold 978 can be maintained after unlock manifold 198B is vented, by the extend manifold 194B for example, at the end of an extend operation.

Optionally, the rotary union units 300, 300C can also include a pressure intensifier 986 configured to intensify the pressure discharged from the check valves 980, 982, 984. Output pressure from the intensifier 986 is designed to cause a pressure adequate to pressurize the seals 966, 968, 970, 972 with a typical 8% to 10% material compression.

When unpressurized, the inside diameters of the seals 966, 968, 970, 972 are a few thousandths of an inch larger than the outer diameter of the rotor 976. Optionally, an embedded flat steel spring, as noted above, can be attached to threaded hollow metal seal stem and can extend 60 degrees either side of seal stem, at the outer diameter of seal internal passage cross section so as to provide support for the seals 966, 968, 970, 972 in the stator grooves 961, 962, 964.

Pressurized seals are thus exposed to other than minor rotational wear only when one or more of three incoming manifolds 194B, 196B, 198B are pressurized, which being a small (low single digit) percentage of time allows for an inverse increase of seal useful life compared to a continuously functioning compressed seal along with an associated increase in seal and rotary union functional reliability.

Optionally, a bleed valve 1000 can be connected to the outputs of check valves 980, 982, 984 so as to slowly bleed pressure from the seal manifold 978. As such, after all operations have ceased such that no pressurized air is provided to the check valves 980, 982, 984, pressurized air can bleed from the manifold 978 to allow the seals 966, 968, 970, 972 to deflate and thus retract, as described above.

Also optionally, a back pressure device 1002 can be provided on unlock manifold 198B on the downstream side of the connection to check valve 984 so as to provide an initial back pressure during initiation of an unlock operation, to thereby speed the inflation of the seals 966, 968, 970, 972.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A tire system comprising:
   a tire having a tread surface and a sidewall;
   a retract module;
   a bolt mounted to the tire so as to be movable along a radial direction relative to the tread surface between a retracted position and an extended position, the bolt being retracted within the tire when in the retracted position and extending through the tread surface when in the extended position, the tire being configured such that the bolt is moved from the extended position to the retracted position by a first actuation force generated using the retract module and applied to the bolt from within the tire;
   a lock mechanism movable between a locked position and an unlocked position in response to a second actuation force, the lock mechanism being configured to mechanically lock the bolt in the retracted position and in the extended position, wherein the lock mechanism is biased toward the locked position with a biasing device such that the lock mechanism remains in the locked position.

2. The tire system according to claim 1 further comprising an extension actuator configured to apply a third actuation force to the bolt so as to move the bolt from the retracted position to the extended position.

3. The tire system according to claim 1 further comprising a retraction actuator configured to apply the first actuation force to the bolt so as to move the bolt from the extended position to the retracted position.

4. The tire system according to claim 1 further comprising at least first and second manifolds extending along an inner circumferential surface of the tire, the first and second manifolds being isolated from an interior volume of the tire.

5. The tire system according to claim 4 further comprising an actuator configured to move the bolt from the retracted position to the extended position, wherein the first manifold is connected to the lock mechanism and the second manifold is connected to the actuator.

6. The tire system according to claim 5 further comprising a third manifold connected to the actuator and configured to either provide the first actuation force for moving the bolt from the extended position to the retracted position or to provide a vent to atmosphere from the actuator interior.

7. The tire system according to claim 4 wherein the first and second manifolds are disposed on a first side of a centerline of the tire, a third manifold and a fourth manifold extending circumferentially around the inner surface of the tire and disposed on a second side of the centerline of the tire, opposite the first side.

8. The tire system according to claim 7 further comprising a fifth manifold extending parallel to the first and second manifolds and disposed on the first side of the centerline and further comprising a sixth manifold extending parallel to the third and fourth manifolds and disposed on the second side of the centerline.

9. The tire system according to claim 1, wherein the bolt comprises at least a bolt carrier portion and a bolt body partially enclosed by the bolt carrier portion, the bolt carrier portion being disposed proximally to a radial center of the tire and the bolt body being disposed distally from the radial center of the tire, the bolt body being connected with the bolt carrier portion so as to provide for effective adjustment of the overall length of the bolt.

10. The tire system according to claim 1, wherein the bolt comprises at least a bolt body portion and a bolt tip portion releasably engaged with the bolt body portion.

11. The tire system according to claim 1, wherein the bolt is mounted to a bolt carrier partially enclosing the bolt and configured to move with the bolt along the radial direction between the retracted position and the extended position, the bolt being mounted to the bolt carrier by an adjustable connection enabling the bolt to be connected to the bolt carrier in at least a first position and a second position relative to the bolt carrier.

12. The tire system according to claim 11, wherein the bolt protrudes a first distance from the bolt carrier in the first position, and by a second distance lesser or greater than the first distance in the second position.

13. The tire system according to claim 11, wherein the adjustable connection comprises internal threads on the bolt carrier, and external threads on the bolt.

14. The tire system according to claim 11, wherein the adjustable connection is further configured to enable removal of the bolt from the bolt carrier from the outside of the tread surface.

15. The tire system according to claim 11, wherein the bolt comprises a bolt body disposed proximally to a radial center of the tire and a bolt tip disposed distally from the radial center of the tire, the bolt tip being removable from the bolt body.

16. The tire system according to claim 1, further comprising at least one reinforcing belt, the at least one reinforcing belt including a plurality of apertures and a corresponding plurality of reinforcing rings attached to the at least one reinforcing belt, each of the plurality of apertures being surrounded by a respective one of the corresponding plurality of reinforcing rings.

17. The tire system according to claim 16, wherein the at least one reinforcing belt comprises steel wires, each of the plurality of apertures interrupting some of the steel wires and resulting in interrupted steel wires having terminal ends disposed at a periphery of each of the plurality of apertures.

18. The tire system according to claim 17, wherein the corresponding plurality of reinforcing rings are configured to route forces between the terminal ends of the interrupted steel wires.

19. The tire system according to claim 17, wherein the corresponding plurality of reinforcing rings are welded to the steel wires.

20. The tire system according to claim 16, further comprising another plurality of reinforcing sheet members corresponding to the plurality of apertures, each of the plurality of apertures being surrounded by a respective one of the another plurality of reinforcing sheet members.

21. The tire system according to claim 20, wherein the another plurality of reinforcing sheet members are disposed between the at least one reinforcing belt and the tread surface.

22. The tire system according to claim 20, wherein each of the another plurality of reinforcing sheet members comprise multiple layers of a fiber material.

23. The tire system according to claim 20, wherein each of the another plurality of reinforcing sheet members comprises multiple layers of a fiber material, each layer of the multiple layers having its fibers oriented in a different direction from other layer of the multiple layers.

24. The tire system according to claim 20, wherein each of the another plurality of reinforcing sheet members comprises strands of material oriented radially, axially, bias to the right, and bias to the left, and wherein the another plurality of reinforcing sheet members is bonded into the tire.

25. The tire system according to claim 20, wherein each of the another plurality of reinforcing sheet members comprises strands of KEVLAR® material oriented so that their fibers extend in different directions, and wherein the another plurality of reinforcing sheet members is bonded into the tire.

26. The tire system according to claim 1, wherein the lock mechanism remains in the locked position without a need for a continuous application of any other force.

* * * * *